United States Patent
Cao et al.

(10) Patent No.: US 10,034,221 B2
(45) Date of Patent: Jul. 24, 2018

(54) METHOD FOR ESTABLISHING BACKHAUL LINK, BASE STATION, RELAY NODE, AND SYSTEM

(71) Applicant: Huawei Technologies Co., Ltd., Shenzhen (CN)

(72) Inventors: Zhenzhen Cao, Beijing (CN); Xin Xiong, Beijing (CN); Mingchao Li, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 114 days.

(21) Appl. No.: 15/067,753

(22) Filed: Mar. 11, 2016

(65) Prior Publication Data

US 2016/0198389 A1    Jul. 7, 2016

Related U.S. Application Data

(63) Continuation of application No. PCT/CN2013/083465, filed on Sep. 13, 2013.

(51) Int. Cl.
*H04W 40/22* (2009.01)
*H04W 76/10* (2018.01)
(Continued)

(52) U.S. Cl.
CPC .......... *H04W 40/22* (2013.01); *H04W 76/02* (2013.01); *H04W 76/10* (2018.02); *H04W 76/04* (2013.01);
(Continued)

(58) Field of Classification Search
CPC ...... H04W 40/22; H04W 76/02; H04W 76/10
See application file for complete search history.

(56) References Cited

U.S. PATENT DOCUMENTS

2010/0046418 A1*  2/2010  Horn ............... H04W 40/22
                                                        370/315
2011/0136494 A1   6/2011  Kim et al.
(Continued)

FOREIGN PATENT DOCUMENTS

CN    102083126 A    6/2011
CN    102132606 A    7/2011
(Continued)

OTHER PUBLICATIONS

"3rd Generation Partnership Project; Technical Specification Group Radio Access Network; Evolved Universal Terrastrial Radio Access Network (E-UTRAN); X2 application protocol (X2AP)(Release 11)", 3GPP TS 36.423 V11.5.0, Jun. 2013, 144 pages.
(Continued)

*Primary Examiner* — Asad Nawaz
*Assistant Examiner* — Syed S Ali

(57) ABSTRACT

Embodiments of the present invention provide a method for establishing a backhaul link, a base station, a relay node and a system, and relate to the field of wireless communications, where the method includes: establishing a connection between a first user equipment part and a first base station; instructing a relay node and a second base station to establish a connection between a second user equipment part and the second base station, where the second base station switches a connection between the second user equipment part and the second base station over to a backhaul link; and switching the connection between the first base station and the first user equipment part over to a backhaul link.

14 Claims, 10 Drawing Sheets

(51) Int. Cl.
*H04W 76/02* (2009.01)
*H04W 76/20* (2018.01)
*H04W 84/04* (2009.01)
*H04W 76/04* (2009.01)
*H04W 88/04* (2009.01)

(52) U.S. Cl.
CPC .......... *H04W 76/20* (2018.02); *H04W 84/047* (2013.01); *H04W 88/04* (2013.01)

(56) References Cited

U.S. PATENT DOCUMENTS

| | | | |
|---|---|---|---|
| 2012/0201189 A1* | 8/2012 | Jung | H04B 7/0413 370/315 |
| 2012/0264430 A1 | 10/2012 | Kim et al. | |
| 2012/0281614 A1* | 11/2012 | Deng | H04W 88/04 370/315 |
| 2013/0208652 A1* | 8/2013 | Morioka | H04B 7/15507 370/315 |
| 2013/0235839 A1* | 9/2013 | Kim | H04L 5/0092 370/329 |
| 2013/0308522 A1* | 11/2013 | Yang | H04B 7/15542 370/315 |
| 2014/0056243 A1* | 2/2014 | Pelletier | H04W 74/04 370/329 |
| 2014/0119237 A1 | 5/2014 | Gan et al. | |
| 2014/0213244 A1* | 7/2014 | Oh | H04W 88/04 455/419 |
| 2015/0036655 A1* | 2/2015 | Pelletier | H04L 5/0005 370/330 |
| 2015/0036658 A1* | 2/2015 | Mochizuki | H04W 24/10 370/331 |
| 2015/0092554 A1* | 4/2015 | Mochizuki | H04W 76/046 370/235 |
| 2015/0341835 A1* | 11/2015 | Bontu | H04W 36/0083 370/331 |
| 2018/0020500 A1* | 1/2018 | Pelletier | H04W 76/046 |
| 2018/0070257 A1* | 3/2018 | Mochizuki | H04W 28/08 |

FOREIGN PATENT DOCUMENTS

| | | |
|---|---|---|
| CN | 102843701 A | 12/2012 |
| CN | 103220789 A | 7/2013 |
| WO | WO 2012/120510 A2 | 9/2012 |

OTHER PUBLICATIONS

"3rd Generation Partnership Project; Technical Specification Group Radio Access Network; Evolved Universal Terrestrial Radio Access Network (E-UTRA) and Evolved Universal Terrestrial Radio Access Network (E-UTRAN); Overall description; Stage 2 (Release 11)", 3GPP TS 36.300 V11.6.0, Jun. 2013, 209 pages.

"3rd Generation Partnership Project; Technical Specification Group Radio Access Network; Evolved Universal Terrestrial Radio Access Network (E-UTRA); Radio Resource Control (RRC); Protocol specification (Release 11)", 3GPP TS 36.331 V11.4.0, Jun. 2013, 346 pages.

"Discussion on mobility enhancements for (H)eNBs-to-HeNBs", CATT, 3GPP TSG-RAN WG3 AH, Jun. 29-Jul. 1, 2010, 8 pages, R3-101878.

* cited by examiner

METHOD FOR ESTABLISHING BACKHAUL LINK, BASE STATION, RELAY NODE, AND SYSTEM

CROSS-REFERENCE TO RELATED APPLICATIONS

This application is a continuation of International Application No. PCT/CN2013/083465, filed on Sep. 13, 2013, which is hereby incorporated by reference in its entirety.

TECHNICAL FIELD

The present invention relates to the field of wireless communications, and in particular, to a method for establishing a backhaul link, a base station, a relay node and a system.

BACKGROUND

With continuous development of mobile communications technologies, to cope with rapid increase of mobile data service traffic, an operator proposes a scenario in which an LPN (Low Power Node, low power node) is deployed, and a user may be served by the LPN and enjoy a high-rate data service. At a place at which there are relatively many mobile users, it may be considered that the already deployed LPN is used as a relay node to establish a wireless backhaul link.

In a conventional method for establishing a wireless backhaul link, a relay node includes a UE (User Experience, user equipment) part and an eNB (evolved NodeB, evolved NodeB) part. The UE part in the relay node accesses a network, communicates with an OAM (Operations, Administration and Maintenance, operations, administration and maintenance) device and obtains a base station list, such as an eNB list or a DeNB (Donor eNB, donor eNB) list, and then the eNB part in the relay node selects a base station from the base station list to perform access, obtains related parameters from the OAM to complete configuration, and finally establishes S1 and X2 connections by using the accessed base station.

During implementation of the present invention, the inventor finds that the prior art at least has the following problem:

There is a conventional relay node including two or more than two UE parts, and when accessing a network, this type of relay node separately establishes a connection to two base stations by using two UE parts, thereby implementing a relay function. The conventional process of establishing a wireless backhaul link is only applicable to a relay node that establishes a connection to a base station by using a UE part and an eNB part, but not applicable to this innovative relay node that establishes a connection to a base station by using two UE parts.

SUMMARY

To resolve a problem that the method provided in the prior art is only applicable to a relay node establishing a connection to a base station by using a UE part and an eNB part, but not applicable to an innovative relay node establishing a connection to a base station by using two UE parts, embodiments of the present invention provide a method for establishing a backhaul link, a base station, a relay node and a system. The technical solutions are as follows:

A first aspect provides a method for establishing a backhaul link, where the method is used for a first base station and includes:
  performing interaction with a relay node, so as to establish at least one connection between the first base station and the relay node, where the relay node includes a first user equipment part and a second user equipment part, and the at least one connection includes a connection between the first base station and the first user equipment part;
  sending a first connection establishment indication to the relay node by using the at least one connection between the first base station and the relay node, and sending a second connection establishment indication to a second base station by using an original connection between the first base station and the second base station, where the first connection establishment indication and the second connection establishment indication are separately used for instructing the relay node to perform interaction with the second base station, so as to establish a connection between the second user equipment part and the second base station, and the second base station switches the connection between the second user equipment part and the second base station over to a backhaul link; and
  switching the connection between the first base station and the first user equipment part over to a backhaul link.

In a first possible implementation manner of the first aspect, the performing interaction with a relay node, so as to establish at least one connection between the first base station and the relay node includes:
  performing first connection establishment interaction with the relay node, so as to establish a first connection, where the first connection is the connection between the first base station and the first user equipment part; or
  performing second connection establishment interaction with the relay node, so as to establish a second connection and a third connection, where the second connection is the connection between the first base station and the first user equipment part, and the third connection is a connection between the first base station and the second user equipment part.

With reference to the first possible implementation manner of the first aspect, in a second possible implementation manner of the first aspect, after the performing first connection establishment interaction with the relay node, so as to establish a first connection, the method further includes:
  receiving, by using the first connection, an indication message sent by the relay node; and
  generating the first connection establishment indication and the second connection establishment indication according to the indication message; and
  the sending a first connection establishment indication to the relay node by using the at least one connection between the first base station and the relay node includes:
  sending the first connection establishment indication to the relay node by using the first connection.

With reference to the second possible implementation manner of the first aspect, in a third possible implementation manner of the first aspect, before the generating the first connection establishment indication and the second connection establishment indication according to the indication message, the method further includes:

receiving, by using the first connection, a type identifier sent by the relay node, where the type identifier is used for indicating a type of the relay node;

detecting according to the type identifier whether the type of the relay node conforms to a predetermined type; and if a detection result is that the type of the relay node conforms to the predetermined type, performing the step of generating the first connection establishment indication and the second connection establishment indication according to the indication message.

With reference to the first possible implementation manner of the first aspect, in a fourth possible implementation manner of the first aspect, after the performing second connection establishment interaction with the relay node, so as to establish a second connection and a third connection, the method further includes:

receiving, by using the second connection or the third connection, an indication message sent by the relay node; and generating the first connection establishment indication and the second connection establishment indication according to the indication message; and the sending a first connection establishment indication to the relay node by using the at least one connection between the first base station and the relay node includes:

sending the first connection establishment indication to the relay node by using the second connection or the third connection.

With reference to the fourth possible implementation manner of the first aspect, in a fifth possible implementation manner of the first aspect, before the generating the first connection establishment indication and the second connection establishment indication according to the indication message, the method further includes:

receiving, by using the second connection, a first identifier sent by the relay node, where the first identifier is used for representing a relay node at which the first user equipment part is located;

receiving, by using the third connection, a second identifier sent by the relay node, the second identifier used for representing a relay node at which the second user equipment part is located;

detecting whether the first identifier matches the second identifier; and if a detection result is that the first identifier matches the second identifier, performing the step of generating the first connection establishment indication and the second connection establishment indication according to the indication message.

With reference to the second, third, fourth or fifth possible implementation manner of the first aspect, in a sixth possible implementation manner of the first aspect, the indication message includes an identifier of the second user equipment part, or the indication message includes an identifier of the first user equipment part and an identifier of the second user equipment part; and the first base station stores an identifier of the second base station;

the sending a first connection establishment indication to the relay node by using the at least one connection between the first base station and the relay node includes:

sending the first connection establishment indication including the identifier of the second user equipment part and the identifier of the second base station to the relay node by using the at least one connection between the first base station and the relay node, where the relay node performs interaction with the second base station according to the identifier of the second user equipment part and the identifier of the second base station, so as to establish the connection between the second user equipment part and the second base station; and the sending a second connection establishment indication to a second base station by using an original connection between the first base station and the second base station includes:

sending the second connection establishment indication including the identifier of the second user equipment part to the second base station by using the original connection between the first base station and the second base station, where the second base station performs interaction with the relay node according to the identifier of the second user equipment part, so as to establish the connection between the second user equipment part and the second base station.

With reference to the sixth possible implementation manner of the first aspect, in a seventh possible implementation manner of the first aspect, the method further includes:

receiving, by using the original connection between the first base station and the second base station, an access channel resource sent by the second base station; and sending the access channel resource to the relay node by using the at least one connection between the first base station and the relay node, where the relay node performs interaction with the second base station according to the access channel resource, so as to establish the connection between the second user equipment part and the second base station, where the access channel resource includes an access channel preamble code preamble code.

With reference to the sixth possible implementation manner of the first aspect, in an eighth possible implementation manner of the first aspect, the method further includes:

sending configuration information to the second base station by using the original connection between the first base station and the second base station, where the second base station configures the connection between the second user equipment part and the second base station according to the configuration information; or sending configuration information to the relay node by using the at least one connection between the first base station and the relay node, where the relay node sends the configuration information to the second base station by using the connection between the second user equipment part and the second base station, and the second base station configures the connection between the second user equipment part and the second base station according to the configuration information.

With reference to the eighth possible implementation manner of the first aspect, in a ninth possible implementation manner of the first aspect, the configuration information includes: radio bearer configuration information RBs configuration and/or subframe configuration information Subframe configuration.

With reference to the sixth possible implementation manner of the first aspect, in a tenth possible implementation manner of the first aspect, the method further includes:

sending a backhaul link switchover indication to the second base station by using the original connection between the first base station and the second base station, where the second base station switches the connection between the second user equipment part and the second base station over to a backhaul link according to the backhaul link switchover indication;

or sending a backhaul link switchover indication to the relay node by using the at least one connection between the first base station and the relay node, where the relay node sends the backhaul link switchover indication to the second base station by using the connection between the second user equipment part and the second base station, and the second base station switches the connection between the second user equipment part and the second base station over to a backhaul link according to the backhaul link switchover indication.

A second aspect provides a method for establishing a backhaul link, where the method is used for a relay node including a first user equipment part and a second user equipment part, and includes:

performing interaction with a first base station, so as to establish at least one connection between the relay node and the first base station, where the at least one connection includes a connection between the first user equipment part and the first base station, and the first base station switches the connection between the first user equipment part and the first base station over to a backhaul link;

receiving, by using the at least one connection between the relay node and the first base station, a first connection establishment indication sent by the first base station; and performing interaction with the second base station according to the first connection establishment indication, so as to establish a connection between the second user equipment part and the second base station, where the second base station switches the connection between the second user equipment part and the second base station over to a backhaul link.

In a first possible implementation manner of the second aspect, before the performing interaction with a first base station, so as to establish at least one connection between the relay node and the first base station, the method further includes:

obtaining an identifier of the first base station from an operations, administration and maintenance device; and the performing interaction with a first base station includes:

performing interaction with the first base station according to the obtained identifier of the first base station.

With reference to the second aspect or the first possible implementation manner of the second aspect, in a second possible implementation manner of the second aspect, the performing interaction with a first base station, so as to establish at least one connection between the relay node and the first base station includes:

performing first connection establishment interaction with the first base station, so as to establish a first connection, where the first connection is the connection between the first user equipment part and the first base station; or performing second connection establishment interaction with the first base station, so as to establish a second connection and a third connection, where the second connection is the connection between the first user equipment part and the first base station, and the third connection is a connection between the second user equipment part and the first base station.

With reference to the second possible implementation manner of the second aspect, in a third possible implementation manner of the second aspect, after the performing first connection establishment interaction with the first base station, so as to establish a first connection, the method further includes:

sending an indication message to the first base station by using the first connection, where the first base station generates the first connection establishment indication according to the indication message; and the receiving, by using the at least one connection between the relay node and the first base station, a first connection establishment indication sent by the first base station includes:

receiving the first connection establishment indication by using the first connection.

With reference to the third possible implementation manner of the second aspect, in a fourth possible implementation manner of the second aspect, the method further includes:

sending a type identifier to the first base station by using the first connection, where the type identifier is used for indicating a type of the relay node, and after detecting according to the type identifier that the type of the relay node conforms to a predetermined type, the first base station performs the step of generating the first connection establishment indication according to the indication message.

With reference to the second possible implementation manner of the second aspect, in a fifth possible implementation manner of the second aspect, after the performing second connection establishment interaction with the first base station, so as to establish a second connection and a third connection, the method further includes:

sending an indication message to the first base station by using the second connection or the third connection, and generating, by the first base station, the first connection establishment indication according to the indication message; and the receiving, by using the at least one connection between the relay node and the first base station, a first connection establishment indication sent by the first base station includes:

receiving the first connection establishment indication by using the second connection or the third connection.

With reference to the fifth possible implementation manner of the second aspect, in a sixth possible implementation manner of the second aspect, the method further includes:

sending a first identifier to the first base station by using the second connection, where the first identifier is used for representing a relay node at which the first user equipment part is located, and sending a second identifier to the first base station by using the third connection, where the second identifier is used for representing a relay node at which the second user equipment part is located, and after detecting that the first identifier matches the second identifier, the first base station performs the step of generating the first connection establishment indication according to the indication message.

With reference to the third, fourth, fifth or sixth possible implementation manner of the second aspect, in a seventh possible implementation manner of the second aspect, the indication message includes an identifier of the second user equipment part, or the indication message includes an identifier of the first user equipment part and an identifier of the second user equipment part; and the first connection establishment indication includes the identifier of the second user equipment part and an identifier of the second base station; and the performing interaction with the second base station according to the first connection establishment indication, so as to establish a connection between the second user equipment part and the second base station includes:

performing interaction with the second base station according to the identifier of the second user equipment part and the identifier of the second base station, so as to establish the connection between the second user equipment part and the second base station.

With reference to the seventh possible implementation manner of the second aspect, in an eighth possible implementation manner of the second aspect, the method further includes:

receiving, by using the at least one connection between the relay node and the first base station, an access channel resource sent by the first base station, where the access channel resource is sent by the second base station to the first base station by using an original connection between the first base station and the second base station; and the performing interaction with the second base station according to the first connection establishment indication, so as to establish a connection between the second user equipment part and the second base station includes:

performing interaction with the second base station according to the access channel resource, so as to establish the connection between the second user equipment part and the second base station, where the access channel resource includes an access channel preamble code preamble code.

With reference to the seventh possible implementation manner of the second aspect, in a ninth possible implementation manner of the second aspect, the method further includes:

receiving, by using the at least one connection between the relay node and the first base station, configuration information sent by the first base station; and sending the configuration information to the second base station by using the connection between the second user equipment part and the second base station, where the second base station configures the connection between the second user equipment part and the second base station according to the configuration information.

With reference to the ninth possible implementation manner of the second aspect, in a tenth possible implementation manner of the second aspect, the configuration information includes: radio bearer configuration information RBs configuration and/or subframe configuration information Subframe configuration.

With reference to the seventh possible implementation manner of the second aspect, in an eleventh possible implementation manner of the second aspect, the method further includes:

receiving, by using the at least one connection between the relay node and the first base station, the backhaul link switchover indication sent by the first base station; and sending the backhaul link switchover indication to the second base station by using the connection between the second user equipment part and the second base station, where the second base station switches the connection between the second user equipment part and the second base station over to a backhaul link according to the backhaul link switchover indication.

A third aspect provides a method for establishing a backhaul link, used for a second base station, where the method includes:

receiving a second connection establishment indication that is sent by a first base station by using an original connection between the first base station and the second base station, where the second connection establishment indication is sent by the first base station after performing interaction with a relay node to establish at least one connection between the first base station and the relay node, the relay node includes a first user equipment part and a second user equipment part, the at least one connection between the first base station and the relay node includes a connection between the first base station and the first user equipment part, and the first base station switches the connection between the first base station and the first user equipment part over to a backhaul link;

performing interaction with the relay node according to the second connection establishment indication, so as to establish a connection between the second base station and the second user equipment part; and switching the connection between the second base station and the second user equipment part over to a backhaul link.

In a first possible implementation manner of the third aspect, the second connection establishment indication includes an identifier of the second user equipment part, and the performing interaction with the relay node according to the second connection establishment indication, so as to establish a connection between the second base station and the second user equipment part includes:

performing interaction with the relay node according to the identifier of the second user equipment part, so as to establish the connection between the second base station and the second user equipment part.

With reference to the third aspect or the first possible implementation manner of the third aspect, in a second possible implementation manner of the third aspect, the method further includes:

sending an access channel resource to the first base station by using the original connection between the first base station and the second base station, where the first base station sends the access channel resource to the relay node by using at least one connection between the first base station and the first user equipment part, and the relay node performs interaction with the second base station according to the access channel resource, so as to establish the connection between the second base station and the second user equipment part, where the access channel resource includes an access channel preamble code preamble code.

With reference to the second possible implementation manner of the third aspect, in a third possible implementation manner of the third aspect, the method further includes:

receiving configuration information that is sent by the first base station by using the original connection between the first base station and the second base station; or receiving configuration information that is sent by the relay node by using the connection between the second base station and the second user equipment part, where the configuration information is sent by the first base station to the relay node by using the at least one connection between the first base station and the first user equipment part; and after the performing interaction with the relay node according to the second connection establishment indication, so as to establish a connection between the second base station and the second user equipment part, the method further includes:

configuring the connection between the second base station and the second user equipment part according to the configuration information.

With reference to the third possible implementation manner of the third aspect, in a fourth possible implementation manner of the third aspect, the configuration information includes: radio bearer configuration information RBs configuration and/or subframe configuration information Subframe configuration.

With reference to the second possible implementation manner of the third aspect, in a fifth possible implementation manner of the third aspect, the method further includes:

receiving a backhaul link switchover indication that is sent by the first base station by using the original connection between the first base station and the second base station; or receiving a backhaul link switchover indication that is sent by the relay node by using the connection between the second base station and the second user equipment part, where the backhaul link switchover indication is sent by the first base station to the relay node by using the at least one connection between the first base station and the first user equipment part; and the switching the connection between the second base station and the second user equipment part over to a backhaul link includes:

switching the connection between the second user equipment part and the second base station over to a backhaul link according to the backhaul link switchover indication.

A fourth aspect provides a first base station, where the first base station includes:

a first interaction module, configured to perform interaction with a relay node, so as to establish at least one connection between the first base station and the relay node, where the relay node includes a first user equipment part and a second user equipment part, and the at least one connection includes a connection between the first base station and the first user equipment part;

a first connection indication sending module, configured to send a first connection establishment indication to the relay node by using the at least one connection between the first base station and the relay node;

a second connection indication sending module, configured to send a second connection establishment indication to a second base station by using an original connection between the first base station and the second base station, where the first connection establishment indication and the second connection establishment indication are separately used for instructing the relay node to perform interaction with the second base station, so as to establish a connection between the second user equipment part and the second base station, and the second base station switches the connection between the second user equipment part and the second base station over to a backhaul link; and a first switchover module, configured to switch the connection between the first base station and the first user equipment part over to a backhaul link.

In a first possible implementation manner of the fourth aspect, the first interaction module includes:

a first interaction unit, configured to perform first connection establishment interaction with the relay node, so as to establish a first connection, where the first connection is the connection between the first base station and the first user equipment part; and a second interaction unit, configured to perform second connection establishment interaction with the relay node, so as to establish a second connection and a third connection, where the second connection is the connection between the first base station and the first user equipment part, and the third connection is a connection between the first base station and the second user equipment part.

With reference to the first possible implementation manner of the fourth aspect, in a second possible implementation manner of the fourth aspect, the first base station further includes:

a first message receiving module, configured to: after the first interaction unit performs the first connection establishment interaction with the relay node, so as to establish the first connection, receive, by using the first connection, an indication message sent by the relay node; and a first connection indication generating module, configured to generate the first connection establishment indication and the second connection establishment indication according to the indication message received by the first message receiving module; and the first connection indication sending module includes:
a first sending unit, configured to send the first connection establishment indication to the relay node by using the first connection.

With reference to the second possible implementation manner of the fourth aspect, in a third possible implementation manner of the fourth aspect, the first base station further includes:

a node type receiving module, configured to: before the first connection indication generating module generates the first connection establishment indication and the second connection establishment indication according to the indication message, receive, by using the first connection, a type identifier sent by the relay node, where the type identifier is used for indicating a type of the relay node; and a first detection module, configured to detect according to the type identifier whether the type of the relay node conforms to a predetermined type; and the first connection indication generating module is configured to: if a detection result of the first detection module is that the type of the relay node conforms to the predetermined type, perform the step of generating the first connection establishment indication and the second connection establishment indication according to the indication message.

With reference to the first possible implementation manner of the fourth aspect, in a fourth possible implementation manner of the fourth aspect, the first base station further includes:

a second message receiving module, configured to: after the second interaction unit performs the second connection establishment interaction with the relay node, so as to establish the second connection and the third connection, receive, by using the second connection or the third connection, an indication message sent by the relay node; and a second connection indication generating module, configured to generate the first connection establishment indication and the second connection establishment indication according to the indication message received by the second message receiving module; and the first connection indication sending module includes:

a second sending unit, configured to send the first connection establishment indication to the relay node by using the second connection or the third connection.

With reference to the fourth possible implementation manner of the fourth aspect, in a fifth possible implementation manner of the fourth aspect, the first base station further includes:

a first identifier receiving module, configured to: before the second connection indication generating module generates the first connection establishment indication and the second connection establishment indication according to the indication message, receive, by using the second connection, a first identifier sent by the relay node, where the first identifier is used for representing a relay node at which the first user equipment part is located;

a second identifier receiving module, configured to: before the second connection indication generating module generates the first connection establishment indication and the second connection establishment indication according to the indication message, receive, by using the third connection, a second identifier sent by the relay node, where the second identifier is used for representing a relay node at which the second user equipment part is located; and a second detection module, configured to detect whether the first identifier matches the second identifier; and the second connection indication generating module is configured to: if a detection result of the second detection module is that the first identifier matches the second identifier, perform the step of generating the first connection establishment indication and the second connection establishment indication according to the indication message.

With reference to the second, third, fourth or fifth possible implementation manner of the fourth aspect, in a sixth possible implementation manner of the fourth aspect, the first connection indication sending module is configured to send the first connection establishment indication including the identifier of the second user equipment part and the identifier of the second base station to the relay node by using the at least one connection between the first base station and the relay node, where the relay node performs interaction with the second base station according to the identifier of the second user equipment part and the identifier of the second base station, so as to establish the connection between the second user equipment part and the second base station; and the second connection indication sending module is configured to send the second connection establishment indication including the identifier of the second user equipment part to the second base station by using the original connection between the first base station and the second base station, where the second base station performs interaction with the relay node according to the identifier of the second user equipment part, so as to establish the connection between the second user equipment part and the second base station, where the indication message includes an identifier of the second user equipment part, or the indication message includes an identifier of the first user equipment part and an identifier of the second user equipment part; and the first base station stores an identifier of the second base station.

With reference to the sixth possible implementation manner of the fourth aspect, in a seventh possible implementation manner of the fourth aspect, the first base station further includes:

a first resource receiving module, configured to receive, by using the original connection between the first base station and the second base station, an access channel resource sent by the second base station; and a first resource sending module, configured to send the access channel resource to the relay node by using the at least one connection between the first base station and the relay node, where the relay node performs interaction with the second base station according to the access channel resource, so as to establish the connection between the second user equipment part and the second base station, where the access channel resource includes an access channel preamble code preamble code.

With reference to the sixth possible implementation manner of the fourth aspect, in an eighth possible implementation manner of the fourth aspect, the first base station further includes:

a first configuration information sending module, configured to send configuration information to the second base station by using the original connection between the first base station and the second base station, where the second base station configures the connection between the second user equipment part and the second base station according to the configuration information; and a second configuration information sending module, configured to send configuration information to the relay node by using the at least one connection between the first base station and the relay node, where the relay node sends the configuration information to the second base station by using the connection between the second user equipment part and the second base station, and the second base station configures the connection between the second user equipment part and the second base station according to the configuration information.

With reference to the eighth possible implementation manner of the fourth aspect, in a ninth possible implementation manner of the fourth aspect, the configuration information includes: radio bearer configuration information RBs configuration and/or subframe configuration information Subframe configuration.

With reference to the sixth possible implementation manner of the fourth aspect, in a tenth possible implementation manner of the fourth aspect, the first base station further includes:

a first switchover indication sending module, configured to send a backhaul link switchover indication to the second base station by using the original connection between the first base station and the second base station, where the second base station switches the connection between the second user equipment part and the second base station over to a backhaul link according to the backhaul link switchover indication; and a second switchover indication sending module, configured to send a backhaul link switchover indication to the relay node by using the at least one connection between the first base station and the relay node, where the relay node sends the backhaul link switchover indication to the second base station by using the connection between the second user equipment part and the second base station, and the second base station switches the connection between the second user equipment part and the second base station over to a backhaul link according to the backhaul link switchover indication.

A fifth aspect provides a first base station, where the first base station includes: a processor, a receiver and a transmitter, where the processor is configured to control the receiver and the transmitter to perform interaction with a relay node, so as to establish at least one connection between the first base station and the relay node, where the relay node includes a first user equipment part and a second user equipment part, and the at least one connection includes a connection between the first base station and the first user equipment part;

the processor is configured to control the transmitter to send a first connection establishment indication to the relay node by using the at least one connection between the first base station and the relay node;

the processor is configured to control the transmitter to send a second connection establishment indication to a second base station by using an original connection between the first base station and the second base station, where the first connection establishment indication and the second connection establishment indication are separately used for instructing the relay node to perform interaction with the second base station, so as to establish a connection between the second user equipment part and the second base station, and the second base station switches the connection between the second user equipment part and the second base station over to a backhaul link; and the processor is configured to switch the connection between the first base station and the first user equipment part over to a backhaul link.

In a first possible implementation manner of the fifth aspect, the processor is configured to control the receiver and the transmitter to perform first connection establishment interaction with the relay node, so as to establish a first connection, where the first connection is the connection between the first base station and the first user equipment part; and the processor is configured to control the receiver and the transmitter to perform second connection establishment interaction with the relay node, so as to establish a second connection and a third connection, where the second connection is the connection between the first base station and the first user equipment part, and the third connection is a connection between the first base station and the second user equipment part.

With reference to the first possible implementation manner of the fifth aspect, in a second possible implementation manner of the fifth aspect, the receiver is configured to: after the processor controls the receiver and the transmitter to perform the first connection establishment interaction with the relay node, so as to establish the first connection, receive, by using the first connection, an indication message sent by the relay node;

the processor is configured to generate the first connection establishment indication and the second connection establishment indication according to the indication message received by the receiver; and the processor is configured to control the transmitter to send the first connection establishment indication to the relay node by using the first connection.

With reference to the second possible implementation manner of the fifth aspect, in a third possible implementation manner of the fifth aspect, the receiver is configured to: before the processor generates the first connection establishment indication and the second connection establishment indication according to the indication message, receive, by using the first connection, a type identifier sent by the relay node, where the type identifier is used for indicating a type of the relay node;

the processor is configured to detect according to the type identifier whether the type of the relay node conforms to a predetermined type; and the processor is configured to: if a detection result is that the type of the relay node conforms to the predetermined type, perform the step of generating the first connection establishment indication and the second connection establishment indication according to the indication message.

With reference to the first possible implementation manner of the fifth aspect, in a fourth possible implementation manner of the fifth aspect, the receiver is configured to: after the processor controls the receiver and the transmitter to perform the second connection establishment interaction with the relay node, so as to establish the second connection and the third connection, receive, by using the second connection or the third connection, an indication message sent by the relay node;

the processor is configured to generate the first connection establishment indication and the second connection establishment indication according to the indication message received by the receiver; and the processor is configured to control the transmitter to send the first connection establishment indication to the relay node by using the second connection or the third connection.

With reference to the fourth possible implementation manner of the fifth aspect, in a fifth possible implementation manner of the fifth aspect, the receiver is configured to: before the processor generates the first connection establishment indication and the second connection establishment indication according to the indication message, receive, by using the second connection, a first identifier sent by the relay node, where the first identifier is used for representing a relay node at which the first user equipment part is located, and receive, by using the third connection, a second identifier sent by the relay node, the second identifier used for representing a relay node at which the second user equipment part is located;

the processor is configured to detect whether the first identifier matches the second identifier; and the processor is configured to: if a detection result is that the first identifier matches the second identifier, perform the step of generating the first connection establishment indication and the second connection establishment indication according to the indication message.

With reference to the second, third, fourth or fifth possible implementation manner of the fifth aspect, in a sixth possible implementation manner of the fifth aspect, the processor is configured to control the transmitter to send the first connection establishment indication including the identifier of the second user equipment part and the identifier of the second base station to the relay node by using the at least one connection between the first base station and the relay node, where the relay node performs interaction with the second base station according to the identifier of the second user equipment part and the identifier of the second base station, so as to establish the connection between the second user equipment part and the second base station; and the processor is configured to control the transmitter to send the second connection establishment indication including the identifier of the second user equipment part to the second base station by using the original connection between the first base station and the second base station, where the second base station performs interaction with the relay node according to the identifier of the second user equipment part, so as to establish the connection between the second user equipment part and the second base station, where the indication message includes an identifier of the second user equipment part, or the indication message includes an identifier of the first user equipment part and an identifier of the second user equipment part; and the first base station stores an identifier of the second base station.

With reference to the sixth possible implementation manner of the fifth aspect, in a seventh possible implementation manner of the fifth aspect, the receiver is configured to receive, by using the original connection between the first base station and the second base station, an access channel resource sent by the second base station; and the processor is configured to control the transmitter to send the access channel resource to the relay node by using the at least one connection between the first base station and the relay node, where the relay node performs interaction with the second base station according to the access channel resource, so as to establish the connection between the second user equipment part and the second base station, where the access channel resource includes an access channel preamble code preamble code.

With reference to the sixth possible implementation manner of the fifth aspect, in an eighth possible implementation manner of the fifth aspect, the processor is configured to control the transmitter to send configuration information to the second base station by using the original connection between the first base station and the second base station, where the second base station configures the connection between the second user equipment part and the second base station according to the configuration information; and the processor is configured to control the transmitter to send configuration information to the relay node by using the at least one connection between the first base station and the relay node, where the relay node sends the configuration information to the second base station by using the connection between the second user equipment part and the second base station, and the second base station configures the connection between the second user equipment part and the second base station according to the configuration information.

With reference to the eighth possible implementation manner of the fifth aspect, in a ninth possible implementation manner of the fifth aspect, the configuration information includes: radio bearer configuration information RBs configuration and/or subframe configuration information Subframe configuration.

With reference to the sixth possible implementation manner of the fifth aspect, in a tenth possible implementation manner of the fifth aspect, the processor is configured to control the transmitter to send a backhaul link switchover indication to the second base station by using the original connection between the first base station and the second base station, where the second base station switches the connection between the second user equipment part and the second base station over to a backhaul link according to the backhaul link switchover indication; or the processor is configured to control the transmitter to send a backhaul link switchover indication to the relay node by using the at least one connection between the first base station and the relay node, where the relay node sends the backhaul link switchover indication to the second base station by using the connection between the second user equipment part and the second base station, and the second base station switches the connection between the second user equipment part and the second base station over to a backhaul link according to the backhaul link switchover indication.

A sixth aspect provides a relay node, where the relay node includes a first user equipment part and a second user equipment part, where the relay node includes:

a second interaction module, configured to perform interaction with a first base station, so as to establish at least one connection between the relay node and the first base station, where the at least one connection includes a connection between the first user equipment part and the first base station, and the first base station switches the connection between the first user equipment part and the first base station over to a backhaul link;

a first indication receiving module, configured to receive, by using the at least one connection between the relay node and the first base station, a first connection establishment indication sent by the first base station; and a third interaction module, configured to perform interaction with the second base station according to the first connection establishment indication, so as to establish a connection between the second user equipment part and the second base station, where the second base station switches the connection between the second user equipment part and the second base station over to a backhaul link.

In a first possible implementation manner of the sixth aspect, the relay node further includes:

an identifier obtaining module, configured to: before the second interaction module performs interaction with the first base station, so as to establish the at least one connection between the relay node and the first base station, obtain an identifier of the first base station from an operations, administration and maintenance device; and the second interaction module is configured to perform interaction with the first base station according to the identifier of the first base station obtained by the identifier obtaining module.

With reference to the second aspect or the first possible implementation manner of the sixth aspect, in a second possible implementation manner of the sixth aspect, the second interaction module includes:

a third interaction unit, configured to perform first connection establishment interaction with the first base station, so as to establish a first connection, where the first connection is the connection between the first user equipment part and the first base station; and a fourth interaction unit, configured to perform second connection establishment interaction with the first base station, so as to establish a second connection and a third connection, where the second connection is the connection between the first user equipment part and the first base station, and the third connection is a connection between the second user equipment part and the first base station.

With reference to the second possible implementation manner of the sixth aspect, in a third possible implementation manner of the sixth aspect, the relay node further includes:
- a first message sending module, configured to: after the third interaction unit performs first connection establishment interaction with the first base station, so as to establish the first connection, send an indication message to the first base station by using the first connection, where the first base station generates the first connection establishment indication according to the indication message; and
- the first indication receiving module includes:
- a first receiving unit, configured to receive the first connection establishment indication by using the first connection.

With reference to the third possible implementation manner of the sixth aspect, in a fourth possible implementation manner of the sixth aspect, the relay node further includes:
- a node type sending module, configured to send a type identifier to the first base station by using the first connection, where the type identifier is used for indicating a type of the relay node, and after detecting according to the type identifier that the type of the relay node conforms to a predetermined type, the first base station performs the step of generating the first connection establishment indication according to the indication message.

With reference to the second possible implementation manner of the sixth aspect, in a fifth possible implementation manner of the sixth aspect, the relay node further includes:
- a second message sending module, configured to: after the fourth interaction unit performs second connection establishment interaction with the first base station, so as to establish the second connection and the third connection, send an indication message to the second base station by using the second connection or the third connection, where the first base station generates the first connection establishment indication according to the indication message; and
- the first indication receiving module includes:
- a second receiving unit, configured to receive the first connection establishment indication by using the second connection or the third connection.

With reference to the fifth possible implementation manner of the sixth aspect, in a sixth possible implementation manner of the sixth aspect, the relay node further includes:
- a first identifier sending module, configured to send a first identifier to the first base station by using the second connection, where the first identifier is used for representing a relay node at which the first user equipment part is located; and
- a second identifier sending module, configured to send a second identifier to the first base station by using the third connection, where the second identifier is used for representing a relay node at which the second user equipment part is located, and after detecting that the first identifier matches the second identifier, the first base station performs the step of generating the first connection establishment indication according to the indication message.

With reference to the third, fourth, fifth or sixth possible implementation manner of the sixth aspect, in a seventh possible implementation manner of the sixth aspect,
- the third interaction module is configured to perform interaction with the second base station according to the identifier of the second user equipment part and the identifier of the second base station, so as to establish the connection between the second user equipment part and the second base station; and
- the indication message includes an identifier of the second user equipment part, or the indication message includes an identifier of the first user equipment part and an identifier of the second user equipment part; and the first connection establishment indication includes the identifier of the second user equipment part and an identifier of the second base station.

With reference to the seventh possible implementation manner of the sixth aspect, in an eighth possible implementation manner of the sixth aspect, the relay node further includes:
- a second resource receiving module, configured to receive, by using the at least one connection between the relay node and the first base station, an access channel resource sent by the first base station, where the access channel resource is sent by the second base station to the first base station by using an original connection between the first base station and the second base station; and
- the third interaction module is configured to perform interaction with the second base station according to the access channel resource, so as to establish the connection between the second user equipment part and the second base station,
- where the access channel resource includes an access channel preamble code preamble code.

With reference to the seventh possible implementation manner of the sixth aspect, in a ninth possible implementation manner of the sixth aspect, the relay node further includes:
- a first configuration information receiving module, configured to receive, by using the at least one connection between the relay node and the first base station, configuration information sent by the first base station; and
- a third configuration information sending module, configured to send the configuration information to the second base station by using the connection between the second user equipment part and the second base station, where the second base station configures the connection between the second user equipment part and the second base station according to the configuration information.

With reference to the ninth possible implementation manner of the sixth aspect, in a tenth possible implementation manner of the sixth aspect, the configuration information includes: radio bearer configuration information RBs configuration and/or subframe configuration information Subframe configuration.

With reference to the seventh possible implementation manner of the sixth aspect, in an eleventh possible implementation manner of the sixth aspect, the relay node further includes:
- a first switchover indication receiving module, configured to receive, by using the at least one connection between the relay node and the first base station, the backhaul link switchover indication sent by the first base station; and
- a third switchover indication sending module, configured to send the backhaul link switchover indication to the second base station by using the connection between the second user equipment part and the second base station, where the second base station switches the connection between the second user equipment part and the second base station over to a backhaul link according to the backhaul link switchover indication.

A seventh aspect provides a relay node, where the relay node includes a first user equipment part and a second user equipment part, where the relay node further includes: a processor, a receiver and a transmitter, where the processor is configured to control the receiver and the transmitter to perform interaction with a first base station, so as to establish at least one connection between the relay node and the first base station, where the at least one connection includes a connection between the first user equipment part and the first base station, and the first base station switches the connection between the first user equipment part and the first base station over to a backhaul link;

the receiver is configured to receive, by using the at least one connection between the relay node and the first base station, a first connection establishment indication sent by the first base station; and the processor is configured to control the receiver and the transmitter to perform interaction with the second base station according to the first connection establishment indication, so as to establish a connection between the second user equipment part and the second base station, where the second base station switches the connection between the second user equipment part and the second base station over to a backhaul link.

In a first possible implementation manner of the seventh aspect, the processor is configured to: before controlling the receiver and the transmitter to perform interaction with the first base station, so as to establish the at least one connection between the relay node and the first base station, control the receiver and the transmitter to obtain an identifier of the first base station from an operations, administration and maintenance device; and the processor is configured to control the receiver and the transmitter to perform interaction with the first base station according to the obtained identifier of the first base station.

With reference to the seventh aspect or the first possible implementation manner of the seventh aspect, in a second possible implementation manner of the seventh aspect, the processor is configured to control the receiver and the transmitter to perform first connection establishment interaction with the first base station, so as to establish a first connection, where the first connection is the connection between the first user equipment part and the first base station; and the processor is configured to control the receiver and the transmitter to perform second connection establishment interaction with the first base station, so as to establish a second connection and a third connection, where the second connection is the connection between the first user equipment part and the first base station, and the third connection is a connection between the second user equipment part and the first base station.

With reference to the second possible implementation manner of the seventh aspect, in a third possible implementation manner of the seventh aspect, the processor is configured to: after controlling the receiver and the transmitter to perform first connection establishment interaction with the first base station, so as to establish the first connection, control the transmitter to send an indication message to the first base station by using the first connection, where the first base station generates the first connection establishment indication according to the indication message; and the receiver is configured to receive the first connection establishment indication by using the first connection.

With reference to the third possible implementation manner of the seventh aspect, in a fourth possible implementation manner of the seventh aspect, the processor is configured to control the transmitter to send a type identifier to the first base station by using the first connection, where the type identifier is used for indicating a type of the relay node, and after detecting according to the type identifier that the type of the relay node conforms to a predetermined type, the first base station performs the step of generating the first connection establishment indication according to the indication message.

With reference to the second possible implementation manner of the seventh aspect, in a fifth possible implementation manner of the seventh aspect, the processor is configured to: after controlling the receiver and the transmitter to perform second connection establishment interaction with the first base station, so as to establish the second connection and the third connection, control the transmitter to send an indication message to the second base station by using the second connection or the third connection, where the first base station generates the first connection establishment indication according to the indication message; and the receiver is configured to receive the first connection establishment indication by using the second connection or the third connection.

With reference to the fifth possible implementation manner of the seventh aspect, in a sixth possible implementation manner of the seventh aspect, the processor is configured to control the transmitter to send a first identifier to the first base station by using the second connection, where the first identifier is used for representing a relay node at which the first user equipment part is located; and the processor is configured to control the transmitter to send a second identifier to the first base station by using the third connection, where the second identifier is used for representing a relay node at which the second user equipment part is located, and after detecting that the first identifier matches the second identifier, the first base station performs the step of generating the first connection establishment indication according to the indication message.

With reference to the third, fourth, fifth or sixth possible implementation manner of the seventh aspect, in a seventh possible implementation manner of the seventh aspect, the processor is configured to control the receiver and the transmitter to perform interaction with the second base station according to the identifier of the second user equipment part and the identifier of the second base station, so as to establish the connection between the second user equipment part and the second base station; and the indication message includes an identifier of the second user equipment part, or the indication message includes an identifier of the first user equipment part and an identifier of the second user equipment part; and the first connection establishment indication includes the identifier of the second user equipment part and an identifier of the second base station.

With reference to the seventh possible implementation manner of the seventh aspect, in an eighth possible implementation manner of the seventh aspect, the receiver is configured to receive, by using the at least one connection between the relay node and the first base station, an access channel resource sent by the first base station, where the access channel resource is sent by the second base station to the first base station by using an original connection between the first base station and the second base station; and the processor is configured to control the receiver and the transmitter to perform interaction with the second base station according to the access channel resource, so as to establish the connection between the second user equipment part and the second base station, where the access channel resource includes an access channel preamble code preamble code.

With reference to the seventh possible implementation manner of the seventh aspect, in a ninth possible implementation manner of the seventh aspect, the receiver is configured to receive, by using the at least one connection between the relay node and the first base station, configuration information sent by the first base station; and the processor is configured to control the transmitter to send the configuration information to the second base station by using the connection between the second user equipment part and the second base station, where the second base station configures the connection between the second user equipment part and the second base station according to the configuration information.

With reference to the ninth possible implementation manner of the seventh aspect, in a tenth possible implementation manner of the seventh aspect, the configuration information includes: radio bearer configuration information RBs configuration and/or subframe configuration information Subframe configuration.

With reference to the seventh possible implementation manner of the seventh aspect, in an eleventh possible implementation manner of the seventh aspect, the receiver is configured to receive, by using the at least one connection between the relay node and the first base station, the backhaul link switchover indication sent by the first base station; and the processor is configured to control the transmitter to send the backhaul link switchover indication to the second base station by using the connection between the second user equipment part and the second base station, where the second base station switches the connection between the second user equipment part and the second base station over to a backhaul link according to the backhaul link switchover indication.

An eighth aspect provides a second base station, where the second base station includes:
 a second indication receiving module, configured to receive a second connection establishment indication that is sent by a first base station by using an original connection between the first base station and the second base station, where the second connection establishment indication is sent by the first base station after performing interaction with a relay node to establish at least one connection between the first base station and the relay node, the relay node includes a first user equipment part and a second user equipment part, the at least one connection between the first base station and the relay node includes a connection between the first base station and the first user equipment part, and the first base station switches the connection between the first base station and the first user equipment part over to a backhaul link;
 a fourth interaction module, configured to perform interaction with the relay node according to the second connection establishment indication, so as to establish a connection between the second base station and the second user equipment part; and
 a second switchover module, configured to switch the connection between the second base station and the second user equipment part over to a backhaul link.

In a first possible implementation manner of the eighth aspect, the fourth interaction module is configured to perform interaction with the relay node according to the identifier of the second user equipment part, so as to establish the connection between the second base station and the second user equipment part; and the second connection establishment indication includes the identifier of the second user equipment part.

With reference to the eighth aspect or the first possible implementation manner of the eighth aspect, in a second possible implementation manner of the eighth aspect, the second base station further includes:
 a second resource sending module, configured to send a channel resource to the first base station by using the original connection between the first base station and the second base station, where the first base station sends the channel resource to the relay node by using at least one connection between the first base station and the first user equipment part, and the relay node performs interaction with the second base station according to the channel resource, so as to establish the connection between the second base station and the second user equipment part,
 where the access channel resource includes an access channel preamble code preamble code.

With reference to the second possible implementation manner of the eighth aspect, in a third possible implementation manner of the eighth aspect, the second base station further includes:
 a second configuration information receiving module, configured to receive configuration information that is sent by the first base station by using the original connection between the first base station and the second base station;
 a third configuration information receiving module, configured to receive configuration information that is sent by the relay node by using the connection between the second base station and the second user equipment part, where the configuration information is sent by the first base station to the relay node by using the at least one connection between the first base station and the first user equipment part; and
 a configuration module, configured to: after the fourth interaction module performs interaction with the relay node according to the second connection establishment indication, so as to establish the connection between the second base station and the second user equipment part, configure the connection between the second base station and the second user equipment part according to the configuration information.

With reference to the third possible implementation manner of the eighth aspect, in a fourth possible implementation manner of the eighth aspect, the configuration information includes: radio bearer configuration information RBs configuration and/or subframe configuration information Subframe configuration.

With reference to the second possible implementation manner of the eighth aspect, in a fifth possible implementation manner of the eighth aspect, the second base station further includes:
 a second switchover indication receiving module, configured to receive a backhaul link switchover indication that is sent by the first base station by using the original connection between the first base station and the second base station; and a third switchover indication receiving module, configured to receive a backhaul link switchover indication that is sent by the relay node by using the connection between the second base station and the second user equipment part, where the backhaul link switchover indication is sent by the first base station to the relay node by using the at least one connection between the first base station and the first user equipment part; and the second switchover module is configured to switch the connection between the second user equipment part and the second base station over to a backhaul link according to the backhaul link switchover indication.

A ninth aspect provides a second base station, where the second base station includes: a processor, a receiver and a transmitter, where the receiver is configured to receive a second connection establishment indication that is sent by a first base station by using an original connection between the first base station and the second base station, where the second connection establishment indication is sent by the first base station after performing interaction with a relay node to establish at least one connection between the first base station and the relay node, the relay node includes a first user equipment part and a second user equipment part, the at least one connection between the first base station and the relay node includes a connection between the first base station and the first user equipment part, and the first base station switches the connection between the first base station and the first user equipment part over to a backhaul link;

the processor is configured to control the receiver and the transmitter to perform interaction with the relay node according to the second connection establishment indication, so as to establish a connection between the second base station and the second user equipment part; and the processor is configured to switch the connection between the second base station and the second user equipment part over to a backhaul link.

In a first possible implementation manner of the ninth aspect, the processor is configured to control the receiver and the transmitter to perform interaction with the relay node according to the identifier of the second user equipment part, so as to establish the connection between the second base station and the second user equipment part; and the second connection establishment indication includes the identifier of the second user equipment part.

With reference to the ninth aspect or the first possible implementation manner of the ninth aspect, in a second possible implementation manner of the ninth aspect, the processor is configured to control the transmitter to send a channel resource to the first base station by using the original connection between the first base station and the second base station, where the first base station sends the channel resource to the relay node by using at least one connection between the first base station and the first user equipment part, and the relay node performs interaction with the second base station according to the channel resource, so as to establish the connection between the second base station and the second user equipment part, where the access channel resource includes an access channel preamble code preamble code.

With reference to the second possible implementation manner of the ninth aspect, in a third possible implementation manner of the ninth aspect, the receiver is configured to receive configuration information that is sent by the first base station by using the original connection between the first base station and the second base station;

the receiver is configured to receive configuration information that is sent by the relay node by using the connection between the second base station and the second user equipment part, where the configuration information is sent by the first base station to the relay node by using the at least one connection between the first base station and the first user equipment part; and the processor is configured to: after controlling the receiver and the transmitter to perform interaction with the relay node according to the second connection establishment indication, so as to establish the connection between the second base station and the second user equipment part, configure the connection between the second base station and the second user equipment part according to the configuration information.

With reference to the third possible implementation manner of the ninth aspect, in a fourth possible implementation manner of the ninth aspect, the configuration information includes: radio bearer configuration information RBs configuration and/or subframe configuration information Subframe configuration.

With reference to the second possible implementation manner of the ninth aspect, in a fifth possible implementation manner of the ninth aspect, the receiver is configured to receive a backhaul link switchover indication that is sent by the first base station by using the original connection between the first base station and the second base station;

the receiver is configured to receive a backhaul link switchover indication that is sent by the relay node by using the connection between the second base station and the second user equipment part, where the backhaul link switchover indication is sent by the first base station to the relay node by using the at least one connection between the first base station and the first user equipment part; and the processor is configured to switch the connection between the second user equipment part and the second base station over to a backhaul link according to the backhaul link switchover indication.

A tenth aspect provides a system for establishing a backhaul link, where the system includes:

the first base station according to the foregoing fourth aspect or fifth aspect, the relay node according to the foregoing sixth aspect or seventh aspect and the second base station according to the foregoing eighth aspect or ninth aspect.

Beneficial effects of the technical solutions provided in the embodiments of the present invention are:

By performing interaction with a relay node, at least one connection between the first base station and the relay node including a first user equipment part and a second user equipment part is established, a first connection establishment indication is sent to the first base station by using the established connection between the first base station and the relay node, and a second connection establishment indication is sent to the second base station by using an original connection between the first base station and a second base station, so that the relay node performs interaction with the second base station, so as to establish a connection between the second user equipment part and the second base station, and the second base station switches the connection between the second user equipment part and the second base station over to a backhaul link, and switches a connection between the first base station and the first user equipment part over to a backhaul link. This resolves the problem that the method provided in the prior art is only applicable to a relay node establishing a connection to a base station by using a UE part and an eNB part, but not applicable to an innovative relay node establishing a connection to a base station by using two UE parts, and achieves an objective that a backhaul link can be established by using the innovative relay node establishing a connection to a base station by using two UE parts.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

Figure 1:
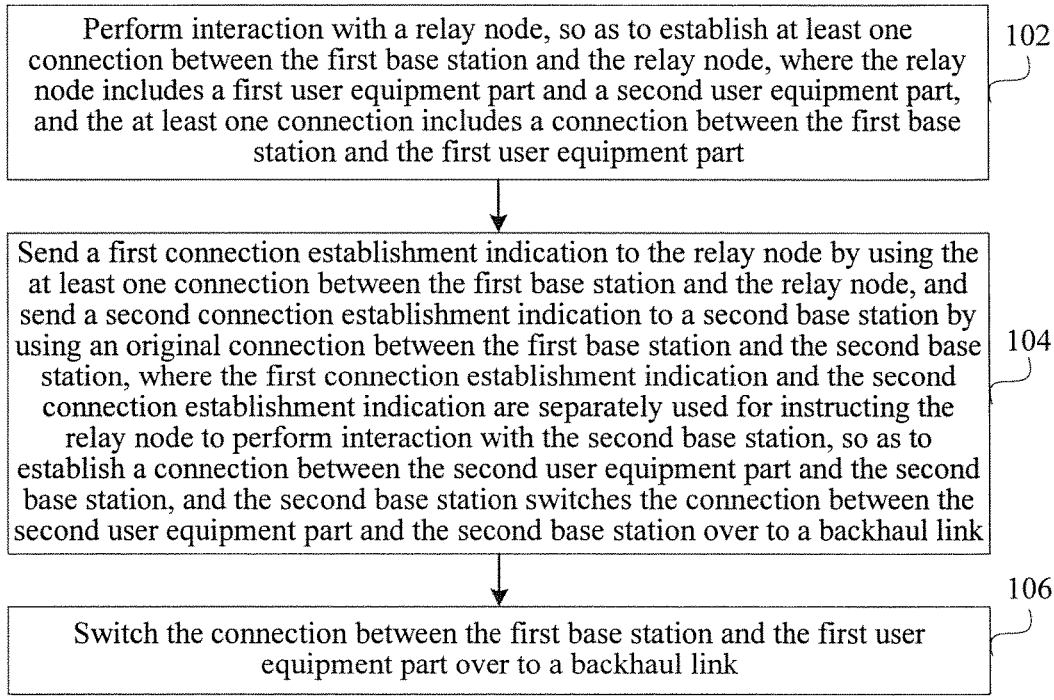
FIG. 1 is a method flowchart of a method for establishing a backhaul link according to an embodiment of the present invention.

Refer to FIG. 1, which shows a method flowchart of a method for establishing a backhaul link according to an embodiment of the present invention. The method may be used for a first base station, and the method may include:

Step 102: Perform interaction with a relay node, so as to establish at least one connection between the first base station and the relay node, where the relay node includes a first user equipment part and a second user equipment part, and the at least one connection includes a connection between the first base station and the first user equipment part.

Step 104: Send a first connection establishment indication to the relay node by using the at least one connection between the first base station and the relay node, and send a second connection establishment indication to a second base station by using an original connection between the first base station and the second base station, where the first connection establishment indication and the second connection establishment indication are separately used for instructing the relay node to perform interaction with the second base station, so as to establish a connection between the second user equipment part and the second base station, and the second base station switches the connection between the second user equipment part and the second base station over to a backhaul link.

Step 106: Switch the connection between the first base station and the first user equipment part over to a backhaul link.

To sum up, in the method for establishing a backhaul link provided in this embodiment of the present invention, by performing interaction with a relay node, at least one connection between the first base station and the relay node including a first user equipment part and a second user equipment part is established, a first connection establishment indication is sent to the first base station by using the established connection between the first base station and the relay node, and a second connection establishment indication is sent to the second base station by using an original connection between the first base station and a second base station, so that the relay node performs interaction with the second base station, so as to establish a connection between the second user equipment part and the second base station, and the second base station switches the connection between the second user equipment part and the second base station over to a backhaul link, and switches a connection between the first base station and the first user equipment part over to a backhaul link. This resolves the problem that the method provided in the prior art is only applicable to a relay node establishing a connection to a base station by using a UE part and an eNB part, but not applicable to an innovative relay node establishing a connection to a base station by using two UE parts, and achieves an objective that a backhaul link can be established by using the innovative relay node establishing a connection to a base station by using two UE parts.

Figure 2:
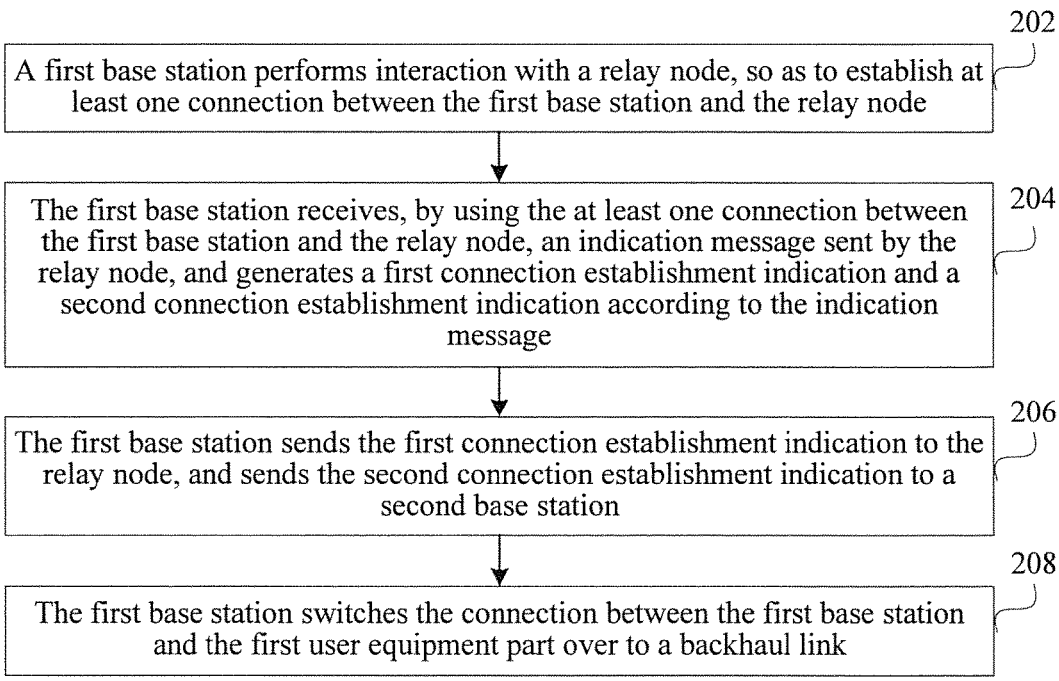
FIG. 2 is a method flowchart of a method for establishing a backhaul link according to another embodiment of the present invention.

Based on a more preferable solution of the method shown in FIG. 1, refer to FIG. 2, which shows a method flowchart of a method for establishing a backhaul link according to another embodiment of the present invention. The method may be used for a first base station, where by performing interaction with a relay node and a second base station, establishment of backhaul links between the first base station, the relay node and the second base station is completed, where the relay node includes a first user part and a second user part. The method may include:

Step 202: The first base station performs interaction with the relay node, so as to establish at least one connection between the first base station and the relay node, where the relay node includes the first user equipment part and the second user equipment part, and the at least one connection includes a connection between the first base station and the first user equipment part.

Specifically, when performing interaction with the relay node, so as to establish the at least one connection between the first base station and the relay node, the first base station may perform first connection establishment interaction with the relay node, so as to establish a first connection, where the first connection is the connection between the first base station and the first user equipment part; or when performing interaction with the relay node, so as to establish the at least one connection between the first base station and the relay node, the first base station may perform second connection establishment interaction with the relay node, so as to establish a second connection and a third connection, where the second connection is the connection between the first base station and the first user equipment part, and the third connection is a connection between the first base station and the second user equipment part.

The connection between the first base station and the relay node may be an RRC connection.

Step 204: The first base station receives, by using the at least one connection between the first base station and the relay node, an indication message sent by the relay node, and generates a first connection establishment indication and a second connection establishment indication according to the indication message, where if the first base station performs first connection establishment interaction with the relay node, so as to establish a first connection, the first base station may receive, by using the first connection, an indication message sent by the relay node, and generate a first connection establishment indication and a second connection establishment indication according to the indication message.

Alternatively, if the first base station performs second connection establishment interaction with the relay node, so as to establish a second connection and a third connection, the first base station may receive, by using the second connection or the third connection, an indication message sent by the relay node, and generate a first connection establishment indication and a second connection establishment indication according to the indication message.

Moreover, before generating a first connection establishment indication and a second connection establishment indication according to the indication message, the first base station may further detect whether the first connection establishment indication and the second connection establishment indication need to be generated.

Specifically, after the first base station performs first connection establishment interaction with the relay node, so as to establish a first connection, the first base station may receive, by using the first connection, a type identifier sent by the relay node, where the type identifier is used for indicating a type of the relay node; and the first base station detects according to the type identifier whether the type of the relay node conforms to a predetermined type; and if a detection result is that the type of the relay node conforms to the predetermined type, performs the step of generating the first connection establishment indication and the second connection establishment indication according to the indication message. It should be noted that, the type identifier may be individually sent by the relay node, or may be sent by carrying the type identifier in the indication message, which is not specifically limited in this embodiment of the present invention.

Alternatively, after the first base station performs second connection establishment interaction with the relay node, so as to establish a second connection and a third connection, the first base station receives, by using the second connection, a first identifier sent by the relay node, where the first identifier is used for representing a relay node at which the first user equipment part is located, and receives, by using the third connection, a second identifier sent by the relay node, the second identifier used for representing a relay node at which the second user equipment part is located; and detects whether the first identifier matches the second identifier, and if a detection result is that the first identifier matches the second identifier, the first base station performs the step of generating the first connection establishment indication and the second connection establishment indication according to the indication message.

In a same network, other types of relay nodes may exist, and a method for establishing a backhaul link by using these other types of relay nodes may be different from the method shown in this embodiment of the present invention; therefore, in the method provided in this embodiment of the present invention, the first base station needs to preferably determine whether the relay node establishing a connection to the first base station may establish a backhaul link by using the method shown in this embodiment of the present invention.

For example, after establishing a connection to a UE part on a relay node, the first base station may receive a type identifier that is sent by the relay node by using the established connection, and is used for indicating a type of the relay node, and when detecting according to the type identify that the type of the relay node conforms to a predetermined type, the first base station determines that the relay node is the relay node in the method shown in this embodiment of the present invention, and performs a step of generating a first connection establishment indication and a second connection establishment indication according to an indication message.

Alternatively, after establishing connections to multiple UE parts, the first base station may receive identifiers of relay nodes at which the multiple UE parts are located, where the identifiers are sent by the relay nodes, at which the multiple UE parts are located, separately by using the multiple established connections, and when detecting that two or more than two UE parts of the multiple UE parts are located at a same relay node, the first base station determines that the relay node at which the two or more than two UE parts are located is the relay node in the method shown in this embodiment of the present invention, and performs a step of generating a first connection establishment indication and a second connection establishment indication according to an indication message.

Moreover, the indication message may include an identifier of the second user equipment part, or the indication message includes an identifier of the first user equipment part and an identifier of the second user equipment part; and the first base station stores an identifier of the second base station, and when generating a first connection establishment indication and a second connection establishment indication, the first base station may generate the first connection establishment indication including an identifier of the second user equipment part and an identifier of the second base station, and generate the second connection establishment indication including the identifier of the second user equipment part.

Specifically, the indication message may include identifiers of all user equipment parts in the relay node, and the first base station selects the identifier of the second user equipment part from the identifiers, and generates the first connection establishment indication and the second connection establishment indication according to the identifier of the second user equipment part.

The identifier of the user equipment part may include but is not limited to an IMSI (International Mobile Subscriber Identification Number, international mobile subscriber identification number) of the corresponding user equipment part.

Step 206: The first base station sends the first connection establishment indication to the relay node, and sends the second connection establishment indication to the second base station, where the first connection establishment indication and the second connection establishment indication are separately used for instructing the relay node to perform interaction with the second base station, so as to establish a connection between the second user equipment part and the second base station, so that the second base station switches the connection between the second user equipment part and the second base station over to a backhaul link.

It should be noted that, when the first base station performs interaction with the relay node, so as to establish the second connection and the third connection, because the third connection is a connection between the second user equipment part and the first base station, and a same user equipment part can only establish a connection to a base station at a same time, the third connection needs to be first disconnected before the relay node performs interaction with the second base station, so as to establish a connection between the second user equipment part and the second base station.

Specifically, the first base station may send a first connection establishment indication to the relay node by using the at least one connection between the first base station and the relay node. For example, when the first base station performs first connection establishment interaction with the relay node, so as to establish a first connection, the first base station may send the first connection establishment indication to the relay node by using the first connection; and when the first base station performs second connection establishment interaction with the relay node, so as to establish a second connection and a third connection, the first base station may send the first connection establishment indication to the relay node by using the second connection or the third connection.

Additionally, the first base station may send a second connection establishment indication to a second base station by using an original connection between the first base station and the second base station.

Specifically, the first base station may send the first connection establishment indication including the identifier of the second user equipment part and the identifier of the second base station to the relay node by using the at least one connection between the first base station and the relay node, where the relay node performs interaction with the second base station according to the identifier of the second user equipment part and the identifier of the second base station, so as to establish the connection between the second user equipment part and the second base station.

The first base station may send the second connection establishment indication including the identifier of the second user equipment part to the second base station by using the original connection between the first base station and the second base station, where the second base station performs interaction with the relay node according to the identifier of the second user equipment part, so as to establish the connection between the second user equipment part and the second base station.

Additionally, the first base station may further receive, by using the original connection between the first base station and the second base station, an access channel resource sent by the second base station; and send the access channel resource to the relay node by using the at least one connection between the first base station and the relay node, where the relay node performs interaction with the second base station according to the access channel resource, so as to establish the connection between the second user equipment part and the second base station, where the access channel resource includes an access channel preamble code preamble code. It should be noted that, the first base station may individually send the access channel resource to the relay node, or may send the first connection establishment indication carrying the access channel resource to the relay node, which is not specifically limited in this embodiment of the present invention.

Additionally, the first base station may send configuration information to the second base station by using the original connection between the first base station and the second base station, where the second base station configures the connection between the second user equipment part and the second base station according to the configuration information; or the first base station may send configuration information to the relay node by using the at least one connection between the first base station and the relay node, where the relay node sends the configuration information to the second base station by using the connection between the second user equipment part and the second base station, and the second base station configures the connection between the second user equipment part and the second base station according to the configuration information.

The configuration information may include: radio bearer configuration information RBs configuration and/or subframe configuration information Subframe configuration.

Moreover, the first base station may further send a backhaul link switchover indication Backhaul HO (Switch Over, switch over) flag to the second base station, so as to instruct the second base station, after a connection between the second user equipment part in the relay node and the second base station is established, to switch the established connection between the second user equipment part and the second base station over to a backhaul link.

Specifically, the first base station may send a backhaul link switchover indication to the second base station by using the original connection between the first base station and the second base station, where the second base station switches the connection between the second user equipment part and the second base station over to a backhaul link according to the backhaul link switchover indication; or the first base station may send a backhaul link switchover indication to the relay node by using the at least one connection between the first base station and the relay node, where the relay node sends the backhaul link switchover indication to the second base station by using the connection between the second user equipment part and the second base station, and the second base station switches the connection between the second user equipment part and the second base station over to a backhaul link according to the backhaul link switchover indication.

It should be noted that, the configuration information and the backhaul link switchover indication may be sent by the first base station to the second base station by using an independent message, or may be carried in the second connection establishment indication and sent to the second base station. Likewise, the access channel resource may be sent by the first base station to the relay node by using an independent message, or may be carried in the first connection establishment indication and sent to the relay node, which is not specifically limited in this embodiment of the present invention.

Additionally, if the first base station performs second connection establishment interaction with the relay node, so as to establish the second connection and the third connection, a same user equipment part can only establish a connection to a base station at a same time; therefore when the relay node performs interaction with the second base station according to the first connection establishment indication, so as to establish a connection between the second user equipment part and the second base station, the third connection needs to be switched over to the connection between the second user equipment part and the second base station, that is, the third connection is first disconnected, and then the connection between the second user equipment part and the second base station is established. The method for establishing the connection between the second user equipment part and the second base station herein is similar to the foregoing steps, and details are not described herein again in this embodiment of the present invention.

Step 208: The first base station switches the connection between the first base station and the first user equipment part over to a backhaul link.

After the first base station switches the connection between the first base station and the first user equipment part over to a backhaul link, and the second base station switches the connection between the second base station and the second user equipment part over to a backhaul link, the second base station may send backhaul link data to the first base station by using the relay node. The backhaul link data includes S1 data and/or X2 data.

In actual application, the foregoing step may be specifically as follows:

By using an example in which the first connection establishment indication carries the access channel resource, the second connection establishment indication carries the configuration information and the backhaul link switchover indication, and the established connections are RRC connections, after being started, the relay node first selects a UE part (such as a first UE part) in the relay node to establish a connection to any eNB, performs an attach operation, and communicates with an OAM, so as to obtain an eNB list and/or a DeNB list. Then the UE part is separated from a network. In a method for the relay node to select the first UE part, the relay node may randomly select any UE part, or may select a UE part used at a previous time.

The relay node selects a first eNB or DeNB (the first base station) from the eNB and/or DeNB list, and a first UE part of the relay node establishes a first RRC connection to the first eNB, and sends an RRC message to the first eNB, that is, the foregoing indication message, where the RRC message may carry information as follows:

a type of the relay node to which the first UE part belongs, and an identifier list of available UE parts in the relay node, where the identifier list includes an identifier of a second UE part.

The first eNB decides according to a measurement report or location information of the first UE part, whether to use the relay node to provide a backhaul link to another eNB.

If the first eNB decides to use the relay node to provide a backhaul link to a second eNB, the first eNB first detects whether the type of the relay node conforms to a predetermined type; and if the type conforms to the predetermined type, the first eNB sends an RRC message according to the first eNB, and sends a second connection indication, that is, the foregoing second connection establishment indication to the second eNB by using an existing link between the first eNB and the second eNB, so as to instruct the second eNB to establish a new wireless backhaul link to the relay node. The second connection indication includes but is not limited to an RN Reconfiguration (Relay Node Reconfiguration, relay node reconfiguration) message, and content of the second connection indication may include one or more information elements as follows:

1) a backhaul link establishment indication Backhaul HO flag, used for instructing the second eNB to switch a wireless backhaul link over to a new established connection;
2) an identifier of the second UE part, used for indicating an identifier of a UE part, in the relay node, establishing a connection to the second eNB, where the identifier of the UE includes but is not limited to an IMSI of a UE part;
3) a radio bearer configuration information RBs configuration, used for indicating an RB (Radio Bear, radio bearer) configuration between the first eNB and a UE part of the relay node; and
4) subframe configuration information Subframe configuration, used for indicating subframes in which the second eNB may transmit backhaul link data by using the relay node after backhaul link establishment is completed.

Moreover, the second eNB further informs, by using the existing link between the second eNB and the first eNB, the first eNB of a dedicated access channel resource that is available when a UE part in the relay node establishes a connection to the second eNB, such as a preamble code or other information.

Subsequently, the first eNB sends a first connection indication, that is, the foregoing first connection establishment indication to the relay node by using the first RRC connection established between the first eNB and the first UE part, to instruct the relay node to establish a second RRC connection to the second eNB, where the first connection indication may include one or more information elements as follows:

1) an identifier of the second UE part, used for indicating an identifier of a second UE part, in the relay node, establishing a connection to the second eNB;

2) an identifier of the second eNB, used for indicating the second eNB establishing a connection to the relay node, where the identifier includes but is not limited to a physical cell identity Physical cell ID (Identity, identity) or global cell identity global cell ID of the second eNB; and 3) a dedicated access channel resource that is available when the second UE part in the relay node establishes a connection to the second eNB, such as a preamble code or other information.

The relay node performs interaction with the second eNB according to the first connection indication and the second connection indication that are sent by the first eNB, and establishes the second RRC connection between the second UE part and the second base station by using the dedicated access channel resource. After configuring the second RRC connection according to the radio bearer configuration information RBs configuration and the subframe configuration information Subframe configuration, the second eNB switches the backhaul link over to the second RRC connection.

Preferably, the first eNB may further send the backhaul link establishment indication Backhaul HO flag, the radio bearer configuration information RBs configuration and the subframe configuration information Subframe configuration to the relay node by using the first RRC connection, and the relay node sends the backhaul link establishment indication Backhaul HO flag, the radio bearer configuration information RBs configuration and the subframe configuration information Subframe configuration to the second eNB by using the second RRC connection.

Alternatively, when establishing an RRC connection to the relay node, the first eNB may establish two or more than two RRC connections at the same time. Specifically, the relay node may select a first eNB (or DeNB) from the obtained eNB list, and multiple UE parts in the relay node, such as the first UE part and the second UE part, establish the first RRC connection and a third RRC connection to the first eNB respectively. The first RRC connection is a connection between the first UE part and the first eNB, and the third RRC connection is a connection between the second UE part and the first eNB. The relay node sends RRC messages to the first eNB separately by using the first RRC connection and the third RRC connection, where the RRC messages separately carry a first identifier used for representing a relay node at which the first UE part is located and a second identifier used for representing a relay node at which the second UE part is located.

The first eNB may detect whether the first identifier matches the second identifier, and if the first identifier matches the second identifier, the first eNB confirms that the first UE part and the second UE part are located at a same relay node, which is equivalent to that the type of the relay node conforms to the predetermined type.

The first eNB decides according to a measurement report or location information of the first UE part and/or the second UE part, whether to use the relay node to provide a backhaul link to another eNB.

If the first eNB decides to use the relay node to provide a backhaul link to the second eNB, the first eNB separately sends switchover indications to the second eNB and the relay node, so as to instruct the relay node and the second eNB to switch the third RRC connection between the second UE part and the first eNB over to the second RRC connection between the second UE part and the second eNB.

When the third RRC connection between the second UE part and the first eNB is switched over to the second RRC connection between the second UE part and the second eNB, the relay node needs to first disconnect the third RRC connection, and then perform interaction with the second eNB, so as to establish the second RRC connection. The process of establishing the second RRC connection is similar to the foregoing process of establishing the second RRC connection when the relay node only establishes the first RRC connection to the first eNB, and details are not described herein again. The difference is that, when the relay node first disconnects the third RRC connection, and then performs interaction with the second eNB, so as to establish the second RRC connection, the second RRC connection may be configured as the first eNB configures the third RRC connection, or may be configured by the second eNB again.

After the first eNB switches the first RRC connection over to a backhaul link, and the second eNB switches the second RRC connection over to a backhaul link, the second base station may send backhaul link data to the first base station by using the relay node. The backhaul link may be S1 data, or may be X2 data.

To sum up, in the method for establishing a backhaul link provided in this embodiment of the present invention, at least one connection between the first base station and a relay node including a first user equipment part and a second user equipment part is established, a first connection establishment indication is sent to the first base station by using the established connection between the first base station and the relay node, and a second connection establishment indication is sent to the second base station by using an original connection between the first base station and a second base station, so that the relay node and the second base station establish a connection between the relay node and the second base station according to the first connection establishment indication and the second connection establishment indication, and therefore the second base station switches a backhaul link over to the connection between the relay node and the second base station. This resolves the problem that the method provided in the prior art is only applicable to a relay node establishing a connection to a base station by using a UE part and an eNB part, but not applicable to an innovative relay node establishing a connection to a base station by using two UE parts, and achieves an objective that a backhaul link can be established by using the innovative relay node establishing a connection to a base station by using two UE parts.

Figure 3:
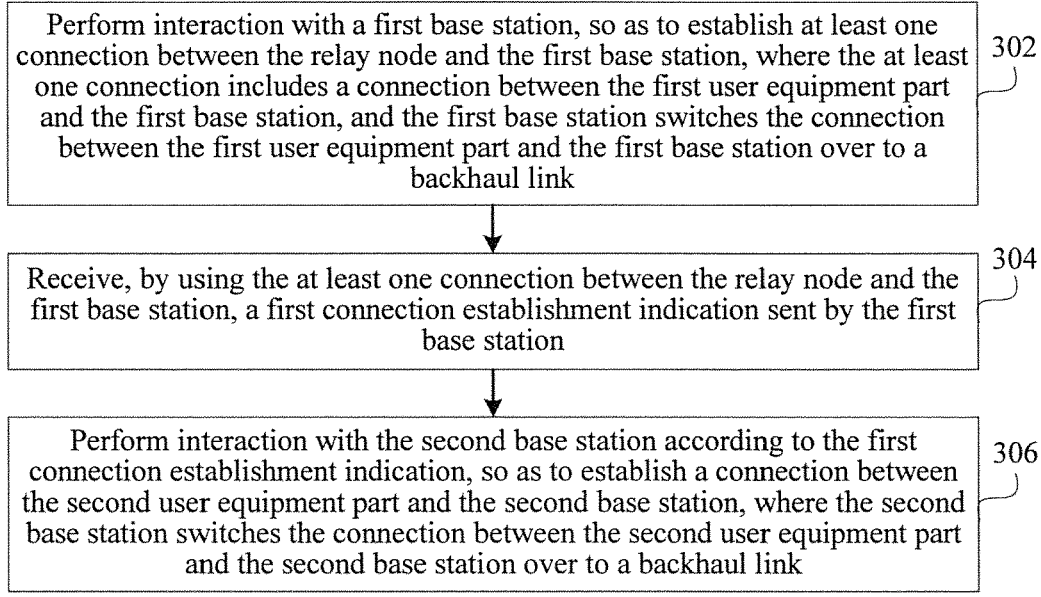
FIG. 3 is a method flowchart of a method for establishing a backhaul link according to an embodiment of the present invention.

Refer to FIG. 3, which shows a method flowchart of a method for establishing a backhaul link according to an embodiment of the present invention. The method is used for a relay node at least including a first user equipment part and a second user equipment part, and the method may include:

Step 302: Perform interaction with a first base station, so as to establish at least one connection between the relay node and the first base station, where the at least one connection includes a connection between the first user equipment part and the first base station, and the first base station switches the connection between the first user equipment part and the first base station over to a backhaul link.

Step 304: Receive, by using the at least one connection between the relay node and the first base station, a first connection establishment indication sent by the first base station.

Step 306: Perform interaction with the second base station according to the first connection establishment indication, so as to establish a connection between the second user equipment part and the second base station, where the second base station switches the connection between the second user equipment part and the second base station over to a backhaul link.

To sum up, in the method for establishing a backhaul link provided in this embodiment of the present invention, interaction with a first base station is first performed, a connection between a first user equipment part and the first base station is established, interaction with a second base station is performed according to an indication sent by the first base station, a connection between a second user equipment part and the second base station is established, and the first base station and the second base station switch the established connections over to backhaul links. This resolves the problem that the method provided in the prior art is only applicable to a relay node establishing a connection to a base station by using a UE part and an eNB part, but not applicable to an innovative relay node establishing a connection to a base station by using two UE parts, and achieves an objective that a backhaul link can be established by using the innovative relay node establishing a connection to a base station by using two UE parts.

Figure 4:
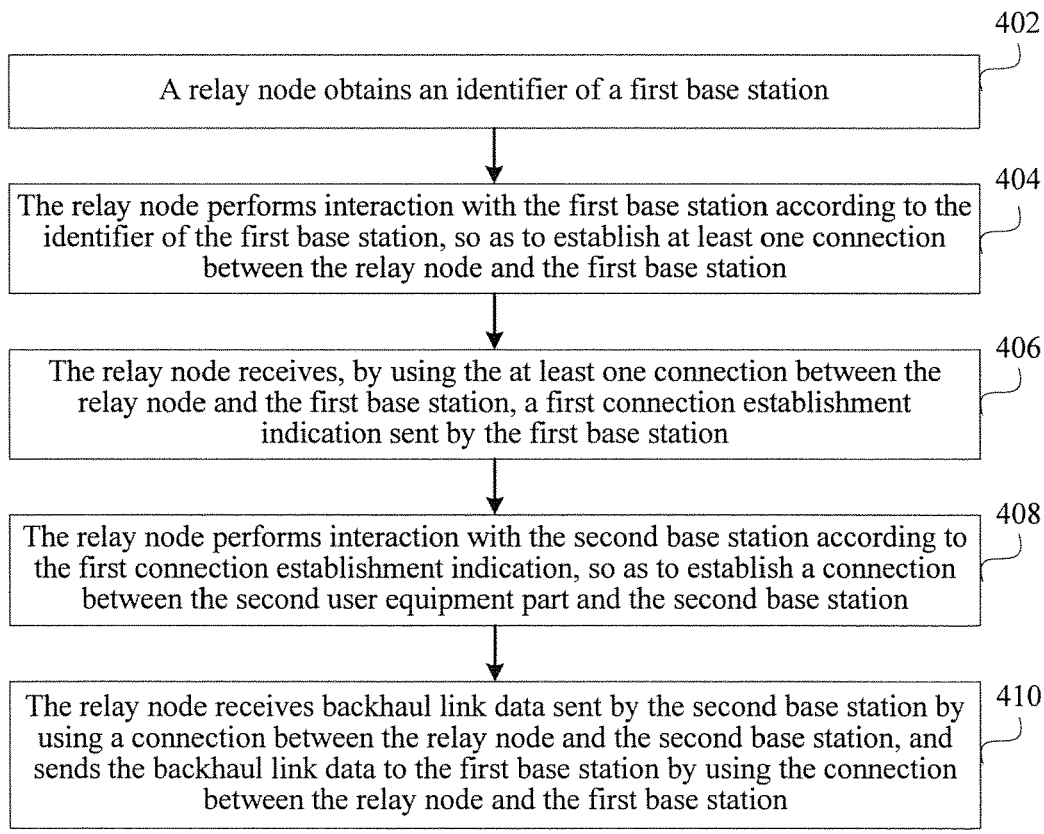
FIG. 4 is a method flowchart of a method for establishing a backhaul link according to another embodiment of the present invention.

Based on a more preferable solution of the method for establishing a backhaul link shown in FIG. 3, refer to FIG. 4, which shows a method flowchart of a method for establishing a backhaul link according to another embodiment of the present invention. The method is used for a relay node at least including a first user equipment part and a second user equipment part, where by performing interaction with a first base station and a second base station, establishment of backhaul links between the first base station, the relay node and the second base station is completed, and the method may include:

Step 402: The relay node obtains an identifier of the first base station.

Specifically, after being started, the relay node first selects a UE part in the relay node, such as a first UE part, establishes a connection to any eNB, performs an attach operation, and communicates with an OAM, to obtain a list of available eNBs and/or DeNBs, where the list includes the identifier of the first base station. Then the UE part is separated from a network. In a method for the relay node to select the first UE part, the relay node may randomly select any UE part, or may select a UE part used at a previous time.

Step 404: The relay node performs interaction with the first base station according to the identifier of the first base station, so as to establish at least one connection between the relay node and the first base station.

The relay node selects the identifier of the first base station from the obtained eNB and/or DeNB list, and performs interaction with the first base station according to the identifier of the first base station, so as to establish at least one connection between the relay node and the first base station. When selecting the identifier of the first base station, the relay node may select the identifier according to a signal strength in descending order, or may select the identifier with reference to other conditions such as a physical distance, a channel environment, and network utilization. The method for the relay node to select the identifier of the first base station from the obtained eNB and/or DeNB list is not specifically limited in this embodiment of the present invention.

When performing interaction with the first base station, the relay node may perform first connection establishment interaction with the first base station, so as to establish a first connection, where the first connection is the connection between the first user equipment part and the first base station; or the relay node may perform second connection establishment interaction with the first base station, so as to establish a second connection and a third connection, where the second connection is the connection between the first user equipment part and the first base station, and the third connection is a connection between the second user equipment part and the first base station.

Specifically, the relay node selects a first eNB or DeNB (the first base station) from the eNB and/or DeNB list, and the first UE part and/or the second UE part of the relay node establishes an RRC connection to the first eNB.

Step 406: The relay node receives, by using the at least one connection between the relay node and the first base station, a first connection establishment indication sent by the first base station.

After performing interaction with the first base station, so as to establish the at least one connection between the relay node and the first base station, the relay node may send an indication message to the first base station by using the established at least one connection, where the indication message at least includes an identifier of the second user equipment part, and the first base station generates the first connection establishment indication according to the indication message, where the first connection establishment indication at least includes the identifier of the second user equipment part and an identifier of the second base station.

Specifically, if the relay node performs first connection establishment interaction with the first base station, so as to establish a first connection, the first base station may send an indication message to the first base station by using the first connection, and the first base station generates the first connection establishment indication according to the indication message; and the relay node may receive the first connection establishment indication by using the first connection.

Alternatively, if the relay node performs second connection establishment interaction with the first base station, so as to establish the second connection and the third connection, the relay node may send an indication message to the second base station by using the second connection or the third connection, where the first base station generates the first connection establishment indication according to the indication message; and the relay node may receive the first connection establishment indication by using the second connection or the third connection.

Moreover, if the relay node performs first connection establishment interaction with the first base station, so as to establish a first connection, the relay node may further send a type identifier to the first base station by using the first connection, where the type identifier is used for indicating a type of the relay node, and after detecting according to the type identifier that the type of the relay node conforms to a predetermined type, the first base station performs the step of generating the first connection establishment indication according to the indication message. It should be noted that, the type identifier may be sent by the relay node by using a single message, or may be sent by carrying the type identifier in the indication message, which is not specifically limited in this embodiment of the present invention.

Alternatively, if the relay node performs second connection establishment interaction with the first base station, so as to establish a second connection and a third connection, the relay node may send a first identifier to the first base station by using the second connection, where the first identifier is used for representing a relay node at which the first user equipment part is located, and send a second identifier to the first base station by using the third connection, where the second identifier is used for representing a relay node at which the second user equipment part is located, and after detecting that the first identifier matches the second identifier, the first base station performs the step of generating the first connection establishment indication according to the indication message. It should be noted that, the first identifier and the second identifier may be sent by the relay node by using an independent message, or may be sent by carrying the type identifier in the indication message, which is not specifically limited in this embodiment of the present invention.

Step 408: The relay node performs interaction with the second base station according to the first connection establishment indication, so as to establish a connection between the second user equipment part and the second base station.

Specifically, the relay node may perform interaction with the second base station according to the identifier of the second user equipment part and the identifier of the second base station, so as to establish the connection between the second user equipment part and the second base station.

Moreover, the relay node may further receive, by using the at least one connection between the relay node and the first base station, an access channel resource sent by the first base station, where the access channel resource may be sent by the second base station to the first base station by using an original connection between the first base station and the second base station; and the relay node may perform interaction with the second base station according to the access channel resource, so as to establish the connection between the second user equipment part and the second base station, where the access channel resource includes an access channel preamble code preamble code. It should be noted that, the access channel resource may be sent by the first base station by using an independent message, or may be carried in the first connection establishment indication and sent.

Additionally, the relay node may further receive, by using the at least one connection between the relay node and the first base station, configuration information sent by the first base station; and send the configuration information to the second base station by using the connection between the second user equipment part and the second base station, where the second base station configures the connection between the second user equipment part and the second base station according to the configuration information. The configuration information may include: radio bearer configuration information RBs configuration and/or subframe configuration information Subframe configuration. Specific content of the foregoing configuration information is not limited in this embodiment of the present invention.

It should be noted that, if the first base station performs second connection establishment interaction with the relay node, so as to establish the second connection and the third connection, a user equipment part can only establish a connection to a base station at a same time; therefore when the relay node performs interaction with the second base station according to the first connection establishment indication, so as to establish a connection between the second user equipment part and the second base station, the third connection needs to be switched over to the connection between the second user equipment part and the second base station, that is, the third connection is first disconnected, and then the connection between the second user equipment part and the second base station is established. The method for establishing the connection between the second user equipment part and the second base station herein is similar to the foregoing steps, and details are not described herein again in this embodiment of the present invention.

Further, the relay node may further receive, by using the at least one connection between the relay node and the first base station, the backhaul link switchover indication sent by the first base station, and send the backhaul link switchover indication to the second base station by using the connection between the second user equipment part and the second base station, and the second base station switches the connection between the second user equipment part and the second base station over to a backhaul link according to the backhaul link switchover indication.

It should be noted that, the configuration information and the backhaul link switchover indication may not be sent by the relay node, and the first base station may further send the configuration information and the backhaul link switchover indication to the second base station by using the original connection between the first base station and the second base station, for example, send the configuration information and the backhaul link switchover indication carried in the second connection establishment indication to the second base station. The second connection establishment indication is sent by the first base station by using the original connection between the first base station and the second base station, and used for instructing the second base station to perform interaction with the relay node, so as to establish the connection between the second user equipment part and the second base station.

Step 410: The relay node receives backhaul link data sent by the second base station by using a connection between the relay node and the second base station, and sends the backhaul link data to the first base station by using the connection between the relay node and the first base station.

The backhaul link data includes S1 data and/or X2 data.

After the first base station switches the connection between the first user part in the relay node and the first base station over to a backhaul link, and the second base station switches the connection between the second user equipment part and the second base station over to a backhaul link, the second base station may send backhaul link data to the first base station by using the relay node.

To sum up, in the method for establishing a backhaul link provided in this embodiment of the present invention, interaction with a first base station is first performed, a connection between a first user equipment part and the first base station is established, interaction with a second base station is performed according to an indication sent by the first base station, a connection between a second user equipment part and the second base station is established, and the first base station and the second base station switch the established connections over to backhaul links. This resolves the problem that the method provided in the prior art is only applicable to a relay node establishing a connection to a base station by using a UE part and an eNB part, but not applicable to an innovative relay node establishing a connection to a base station by using two UE parts, and achieves an objective that a backhaul link can be established by using the innovative relay node establishing a connection to a base station by using two UE parts.

Figure 5:
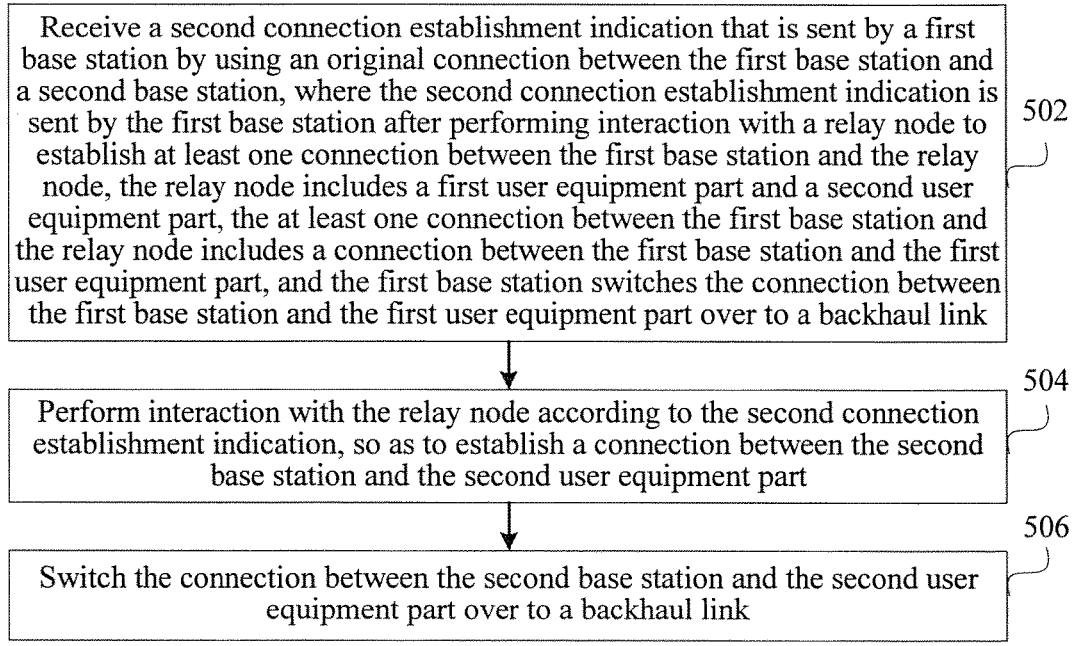
FIG. 5 is a method flowchart of a method for establishing a backhaul link according to an embodiment of the present invention.

Refer to FIG. 5, which shows a method flowchart of a method for establishing a backhaul link according to an embodiment of the present invention. The method is used for a second base station, and the method may include:

Step 502: Receive a second connection establishment indication that is sent by a first base station by using an original connection between the first base station and the second base station, where the second connection establishment indication is sent by the first base station after performing interaction with a relay node to establish at least one connection between the first base station and the relay node, the relay node includes a first user equipment part and a second user equipment part, the at least one connection between the first base station and the relay node includes a connection between the first base station and the first user equipment part, and the first base station switches the connection between the first base station and the first user equipment part over to a backhaul link.

Step 504: Perform interaction with the relay node according to the second connection establishment indication, so as to establish a connection between the second base station and the second user equipment part.

Step 506: Switch the connection between the second base station and the second user equipment part over to a backhaul link.

To sum up, in the method for establishing a backhaul link provided in this embodiment of the present invention, a second connection establishment indication that is sent by a first base station by using an original connection between the first base station and a second base station is received, interaction with a relay node including a first user equipment part and a second user equipment part is performed according to the second connection establishment indication, so as to establish a connection between the second base station and the second user equipment part, and a backhaul link is switched over to the connection between the second base station and the second user equipment part. This resolves the problem that the method provided in the prior art is only applicable to a relay node establishing a connection to a base station by using a UE part and an eNB part, but not applicable to an innovative relay node establishing a connection to a base station by using two UE parts, and achieves an objective that a backhaul link can be established by using the innovative relay node establishing a connection to a base station by using two UE parts.

Figure 6:
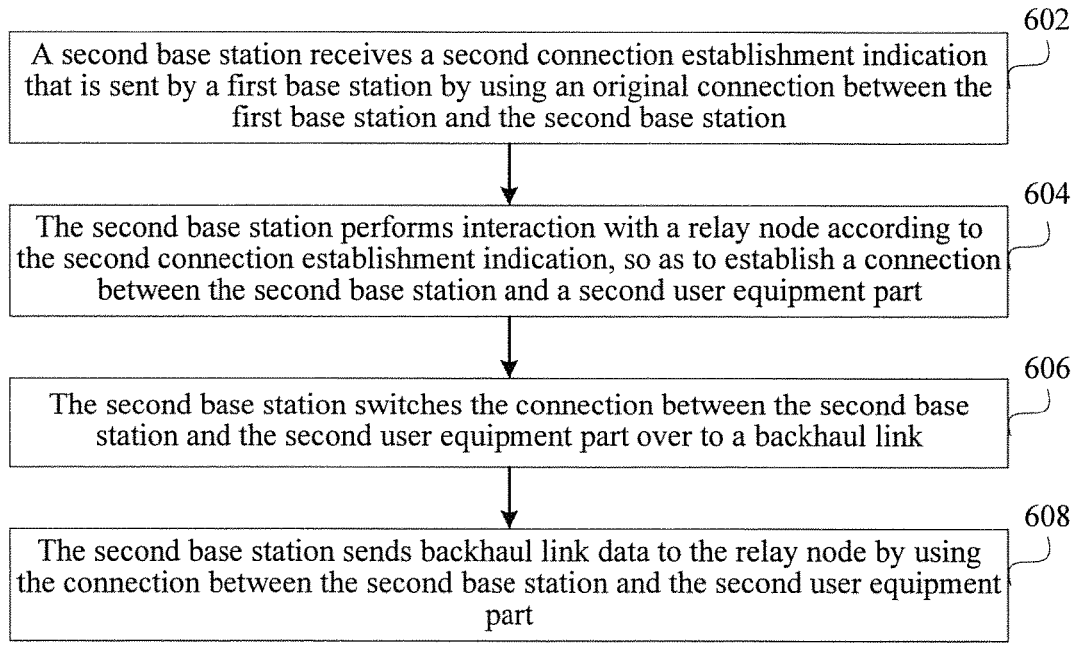
FIG. 6 is a method flowchart of a method for establishing a backhaul link according to another embodiment of the present invention.

Based on a more preferable solution of the method for establishing a backhaul link shown in FIG. 5, refer to FIG. 6, which shows a method flowchart of a method for establishing a backhaul link according to another embodiment of the present invention. The method is used for a second base station, and by performing interaction with a relay node and a first base station, establishment of backhaul links between the first base station, the relay node and the second base station is completed. The method may include:

Step 602: The second base station receives a second connection establishment indication that is sent by the first base station by using an original connection between the first base station and the second base station.

The second connection establishment indication is sent by the first base station after performing interaction with a relay node to establish at least one connection between the first base station and the relay node, where the relay node includes a first user equipment part and a second user equipment part. The at least one connection between the first base station and the relay node includes a connection between the first base station and the first user equipment part, and the first base station may switch the connection between the first base station and the first user equipment part over to a backhaul link.

The relay node may send an indication message to the first base station by using the at least one connection between the first base station and the relay node, where the indication message includes an identifier of the second user equipment part, or the indication message includes an identifier of the first user equipment part and an identifier of the second user equipment part. The first base station generates the second connection establishment indication according to the indication message.

Step 604: The second base station performs interaction with the relay node according to the second connection establishment indication, so as to establish a connection between the second base station and a second user equipment part.

The second connection establishment indication includes an identifier of the second user equipment part. The second base station may perform interaction with the relay node according to the identifier of the second user equipment part, so as to establish the connection between the second base station and the second user equipment part.

Moreover, before performing interaction with the relay node according to the second connection establishment indication, so as to establish the connection between the second base station and the second user equipment part, the second base station may further send an access channel resource to the first base station by using the original connection between the first base station and the second base station, the first base station sends the access channel resource to the relay node by using the at least one connection between the first base station and the first user equipment part, and the relay node performs interaction with the second base station according to the access channel resource, so as to establish the connection between the second base station and the second user equipment part, where the access channel resource includes an access channel preamble code preamble code.

Further, the second base station may further receive configuration information that is sent by the first base station by using the original connection between the first base station and the second base station; or the second base station may receive configuration information that is sent by the relay node by using the connection between the second base station and the second user equipment part, where the configuration information is sent by the first base station to the relay node by using the at least one connection between the first base station and the first user equipment part. The second base station may configure the connection between the second base station and the second user equipment part according to the configuration information. The configuration information may include: radio bearer configuration information RBs configuration and/or subframe configuration information Subframe configuration.

Specifically, for example, before the second base station performs interaction with the relay node according to the second connection establishment indication, so as to establish the connection between the second base station and the second user equipment part, the second base station may receive configuration information that is sent by the first base station by using the original connection between the first base station and the second base station, where the configuration information may be sent by using an independent message, or may be carried in the second connection establishment indication, which is not specifically limited in this embodiment of the present invention.

Alternatively, after the second base station performs interaction with the relay node according to the second connection establishment indication, so as to establish the connection between the second base station and the second user equipment part, the second base station may receive configuration information that is sent by the relay node by using the connection between the second base station and the second user equipment part, where the configuration information is sent by the first base station to the relay node by using using the at least one connection between the first base station and the first user equipment part.

Step 606: The second base station switches the connection between the second base station and the second user equipment part over to a backhaul link.

The second base station may receive a backhaul link switchover indication that is sent by the first base station by using the original connection between the first base station and the second base station; or the second base station may receive a backhaul link switchover indication that is sent by the relay node by using the connection between the second base station and the second user equipment part, where the backhaul link switchover indication is sent by the first base station to the relay node by using the at least one connection between the first base station and the first user equipment part; and the second base station switches the connection between the second user equipment part and the second base station over to a backhaul link according to the backhaul link switchover indication.

Specifically, for example, before the second base station performs interaction with the relay node according to the second connection establishment indication, so as to establish the connection between the second base station and the second user equipment part, the second base station may receive a backhaul link switchover indication that is sent by the first base station by using the original connection between the first base station and the second base station, where the backhaul link switchover indication may be sent by using an independent message, or may be carried in the second connection establishment indication, which is not specifically limited in this embodiment of the present invention.

Alternatively, after the second base station performs interaction with the relay node according to the second connection establishment indication, so as to establish the connection between the second base station and the second user equipment part, the second base station may receive a backhaul link switchover indication that is sent by the relay node by using the connection between the second base station and the second user equipment part, where the backhaul link switchover indication is sent by the first base station to the relay node by using the at least one connection between the first base station and the first user equipment part.

Step 608: The second base station sends backhaul link data to the relay node by using the connection between the second base station and the second user equipment part.

After the second base station switches the connection between the second base station and the second user equipment part over to a backhaul link, and the first base station switches the connection between the first base station and the first user equipment part over to a backhaul link, the second base station may send backhaul link data to the first base station by using the relay node.

The backhaul link data includes S1 data and/or X2 data.

To sum up, in the method for establishing a backhaul link provided in this embodiment of the present invention, a second connection establishment indication that is sent by a first base station by using an original connection between the first base station and a second base station is received, interaction with a relay node including a first user equipment part and a second user equipment part is performed according to the second connection establishment indication, so as to establish a connection between the second base station and the second user equipment part, and a backhaul link is switched over to the connection between the second base station and the second user equipment part. This resolves the problem that the method provided in the prior art is only applicable to a relay node establishing a connection to a base station by using a UE part and an eNB part, but not applicable to an innovative relay node establishing a connection to a base station by using two UE parts, and achieves an objective that a backhaul link can be established by using the innovative relay node establishing a connection to a base station by using two UE parts.

Figure 7:
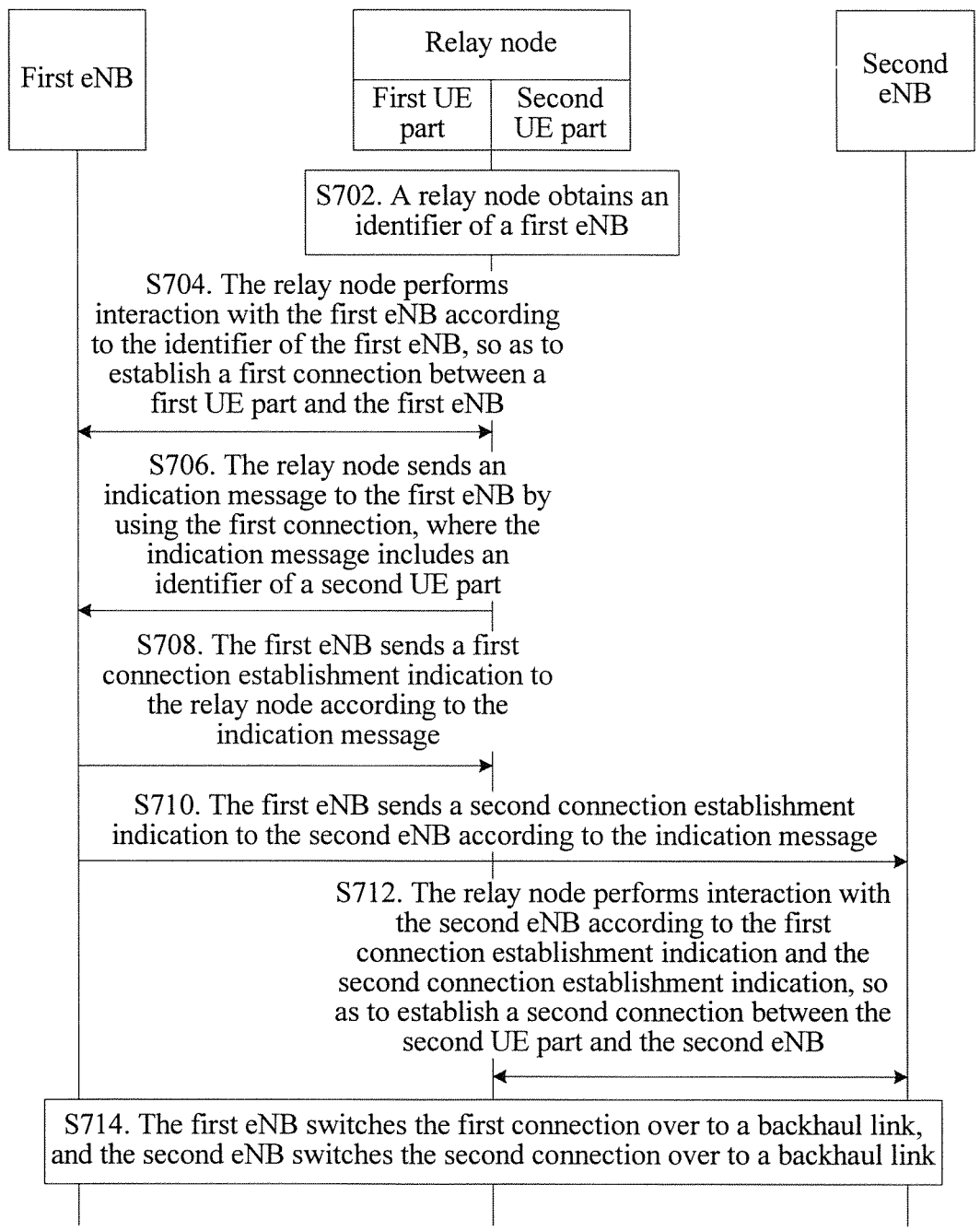
FIG. 7 is a method flowchart of a method for establishing a backhaul link according to an embodiment of the present invention.

Refer to FIG. 7, which shows a method flowchart of a method for establishing a backhaul link according to an embodiment of the present invention. The method for establishing a process may be used for establishing a backhaul link between a first base station and a second base station by using a relay node including a first user equipment part and a second user equipment part. An example in which the relay node includes the first UE part and the second UE part, and the backhaul link between a first eNB and a second eNB is established by using the relay node is used, and the method for establishing a backhaul link may include:

Step 702: The relay node obtains an identifier of the first eNB.

Specifically, after being started, the relay node first selects a UE part in the relay node, such as a first UE part, establishes a connection to any eNB, performs an attach operation, and communicates with an OAM, to obtain a list of available eNBs, where the list includes the identifier of the first eNB. Then the UE part is separated from a network. In a method for the relay node to select the first UE part, the relay node may randomly select any UE part, or may select a UE part used at a previous time.

Step 704: The relay node performs interaction with the first eNB according to the identifier of the first eNB, so as to establish a first connection between the first UE part and the first eNB.

The relay node selects the identifier of the first eNB from the obtained eNB list, and performs interaction with the first eNB according to the identifier of the first eNB, so as to establish the connection between the first UE part and the first eNB. When selecting the identifier of the first eNB, the relay node may select the identifier according to a signal strength in descending order, or may select the identifier with reference to other conditions such as a physical distance, a channel environment, and network utilization. The method for the relay node to select the identifier of the first eNB from the obtained eNB list is not specifically limited in this embodiment of the present invention.

Step 706: The relay node sends an indication message to the first eNB by using the first connection, where the indication message includes an identifier of the second UE part.

Specifically, the indication message may carry a type of the relay node and an identifier list of all available UE parts in the relay node, where the identifier list includes the identifier of the second UE part, and preferably, may further include an identifier of the first UE part.

Moreover, the type of the relay node may be also sent to the second eNB by the relay node by using an independent message.

Step 708: The first eNB sends a first connection establishment indication to the relay node according to the indication message.

The first eNB decides according to a measurement report or location information of the first UE part, whether to use the relay node to provide a backhaul link to another eNB. If it is decided that the relay node is used for providing a backhaul link to another eNB, the first connection establishment indication is sent to the relay node.

When detecting that the type of the relay node carried in the indication message conforms to a predetermined type, the first eNB generates the first connection establishment indication, and sends the first connection establishment indication to the relay node by using the first connection. The first connection establishment indication may include elements as follows:

1) an identifier of the second UE part, used for indicating an identifier of a second UE part, in the relay node, establishing a connection to the second eNB;
2) an identifier of the second eNB, used for indicating the second eNB establishing a connection to the relay node, where the identifier includes but is not limited to a physical cell identity Physical cell ID (Identity, identity) or global cell identity global cell ID of the second eNB; and
3) a dedicated access channel resource that is available when the second UE part in the relay node establishes a connection to the second eNB, such as a preamble code or other information.

The access channel resource may be an access channel resource sent by the second eNB in advance to the first eNB by using an original connection between the first eNB and the second eNB.

Step 710: The first eNB sends a second connection establishment indication to the second eNB according to the indication message.

The first eNB may generate the second connection establishment indication according to the indication message, and send the second connection establishment indication to the second eNB by using the first eNB. The second connection establishment indication may include elements as follows:

1) a backhaul link establishment indication Backhaul HO flag, used for instructing the second eNB to switch a wireless backhaul link over to a new established connection;
2) an identifier of the second UE part, used for indicating an identifier of a UE part, in the relay node, establishing a connection to the second eNB, where the identifier of the UE includes but is not limited to an IMSI of a UE part;
3) a radio bearer configuration information RBs configuration, used for indicating an RB (Radio Bear, radio bearer) configuration between the first eNB and a UE part of the relay node; and
4) subframe configuration information Subframe configuration, used for indicating subframes in which the second eNB may transmit backhaul link data by using the relay node after backhaul link establishment is completed.

Step 712: The relay node performs interaction with the second eNB according to the first connection establishment indication and the second connection establishment indication, so as to establish a second connection between the second UE part and the second eNB.

Specifically, after the relay node performs interaction with the second eNB by using an identifier of the first UE part and an identifier of the second eNB that are in the first connection establishment indication and the second connection establishment indication, and establishes the second connection by using a dedicated access channel resource, the second eNB configures the second connection according to radio bearer configuration information RBs configuration and subframe configuration information Subframe configuration.

Step 714: The first eNB switches the first connection over to a backhaul link, and the second eNB switches the second connection over to a backhaul link.

The second eNB may switch the second connection over to a backhaul link according to the backhaul link establishment indication Backhaul HO flag.

It should be noted that, the foregoing dedicated access channel resource may be sent by the first eNB to the relay node by using an independent message. Likewise, the backhaul link establishment indication, the radio bearer configuration information and the subframe configuration information may be also sent by the first eNB to the second eNB by using an independent message, for example, the first eNB may send the backhaul link establishment indication, the radio bearer configuration information and/or the subframe configuration information to the second eNB in an independent message form by using the original connection between the first eNB and the second eNB, the first eNB may also send the backhaul link establishment indication, the radio bearer configuration information and/or the subframe configuration information to the relay node in an independent message form by using the first connection, and the relay node sends the backhaul link establishment indication, the radio bearer configuration information and/or the subframe configuration information to the second eNB by using the second connection.

Moreover, when establishing a connection to the relay node, the first eNB may establish two or more than two connects at the same time, and specifically, multiple UE parts in the relay node (such as two, a first UE part and a second UE part) separately establish a first connection and a third connection to the first eNB. The first connection is a connection between the first UE part and the first eNB, and the third connection is a connection between the second UE part and the first eNB. The relay node separately sends messages to the first eNB separately by using the first connection and the third connection, where the messages separately carry a first identifier used for representing a relay node at which the first UE part is located and a second identifier used for representing a relay node at which the second UE part is located.

The first eNB may detect whether the first identifier matches the second identifier, and if the first identifier matches the second identifier, the first eNB confirms that the first UE part and the second UE part are located at a same relay node, which is equivalent to that the type of the relay node conforms to the predetermined type.

The first eNB decides according to a measurement report or location information of the first UE part and/or the second UE part, whether to use the relay node to provide a backhaul link to another eNB.

If the first eNB decides to use the relay node to provide a backhaul link to the second eNB, the first eNB separately sends switchover indications to the second eNB and the relay node, so as to instruct the relay node and the second eNB to switch the third connection between the second UE part and the first eNB over to the second connection between the second UE part and the second eNB.

When the third connection between the second UE part and the first eNB is switched over to the second RRC connection between the second UE part and the second eNB, the relay node needs to first disconnect the third connection, and then perform interaction with the second eNB, so as to establish the second connection. The process of establishing the second connection is similar to the foregoing process of establishing the second connection when the relay node only establishes the first connection to the first eNB, and details are not described herein again. The difference is that, when the relay node first disconnects the third connection, and then performs interaction with the second eNB, so as to establish the second connection, the second connection may be configured as the first eNB configures the third connection, or may be configured by the second eNB again.

After the first eNB switches the first connection over to a backhaul link, and the second eNB switches the second connection over to a backhaul link, the second base station may send backhaul link data to the first base station by using the relay node. The backhaul link may be S1 data, or may be X2 data.

To sum up, in the method for establishing a backhaul link provided in this embodiment of the present invention, a relay node first performs interaction with a first base station, so as to establish a connection between a first user equipment part and the first base station, and then performs interaction with a second base station, so as to establish a connection between a second user equipment part and the second base station, and the first base station and the second base station switch the established connections over to backhaul links. This resolves the problem that the method provided in the prior art is only applicable to a relay node establishing a connection to a base station by using a UE part and an eNB part, but not applicable to an innovative relay node establishing a connection to a base station by using two UE parts, and achieves an objective that a backhaul link can be established by using the innovative relay node establishing a connection to a base station by using two UE parts.

Figure 8:
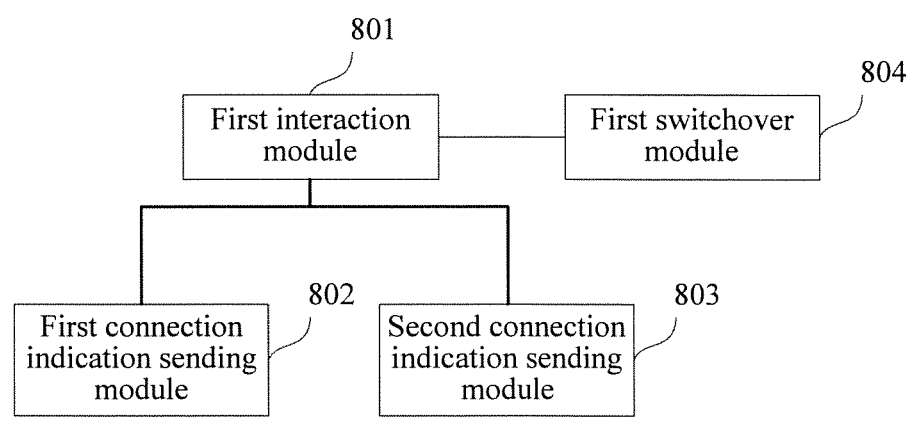
FIG. 8 is a device composition diagram of a first base station according to an embodiment of the present invention.

Refer to FIG. 8, which shows a device composition diagram of a first base station according to an embodiment of the present invention. The first base station may be an eNB or a DeNB, and the first base station may be implemented as the first base station in the method for establishing a backhaul link shown in FIG. 1 or FIG. 2. The first base station may include:

- a first interaction module 801, configured to perform interaction with a relay node, so as to establish at least one connection between the first base station and the relay node, where the relay node includes a first user equipment part and a second user equipment part, and the at least one connection includes a connection between the first base station and the first user equipment part;
- a first connection indication sending module 802, configured to send a first connection establishment indication to the relay node by using the at least one connection between the first base station and the relay node;
- a second connection indication sending module 803, configured to send a second connection establishment indication to a second base station by using an original connection between the first base station and the second base station, where the first connection establishment indication and the second connection establishment indication are separately used for instructing the relay node to perform interaction with the second base station, so as to establish a connection between the second user equipment part and the second base station, and the second base station switches the connection between the second user equipment part and the second base station over to a backhaul link; and
- a first switchover module 804, configured to switch the connection between the first base station and the first user equipment part over to a backhaul link.

To sum up, in the first base station provided in this embodiment of the present invention, by performing interaction with a relay node, at least one connection between the first base station and the relay node including a first user equipment part and a second user equipment part is established, a first connection establishment indication is sent to the first base station by using the established connection between the first base station and the relay node, and a second connection establishment indication is sent to the second base station by using an original connection between the first base station and a second base station, so that the relay node performs interaction with the second base station, so as to establish a connection between the second user equipment part and the second base station, and the second base station switches the connection between the second user equipment part and the second base station over to a backhaul link, and switches a connection between the first base station and the first user equipment part over to a backhaul link. This resolves the problem that the method provided in the prior art is only applicable to a relay node establishing a connection to a base station by using a UE part and an eNB part, but not applicable to an innovative relay node establishing a connection to a base station by using two UE parts, and achieves an objective that a backhaul link can be established by using the innovative relay node establishing a connection to a base station by using two UE parts.

Figure 9:
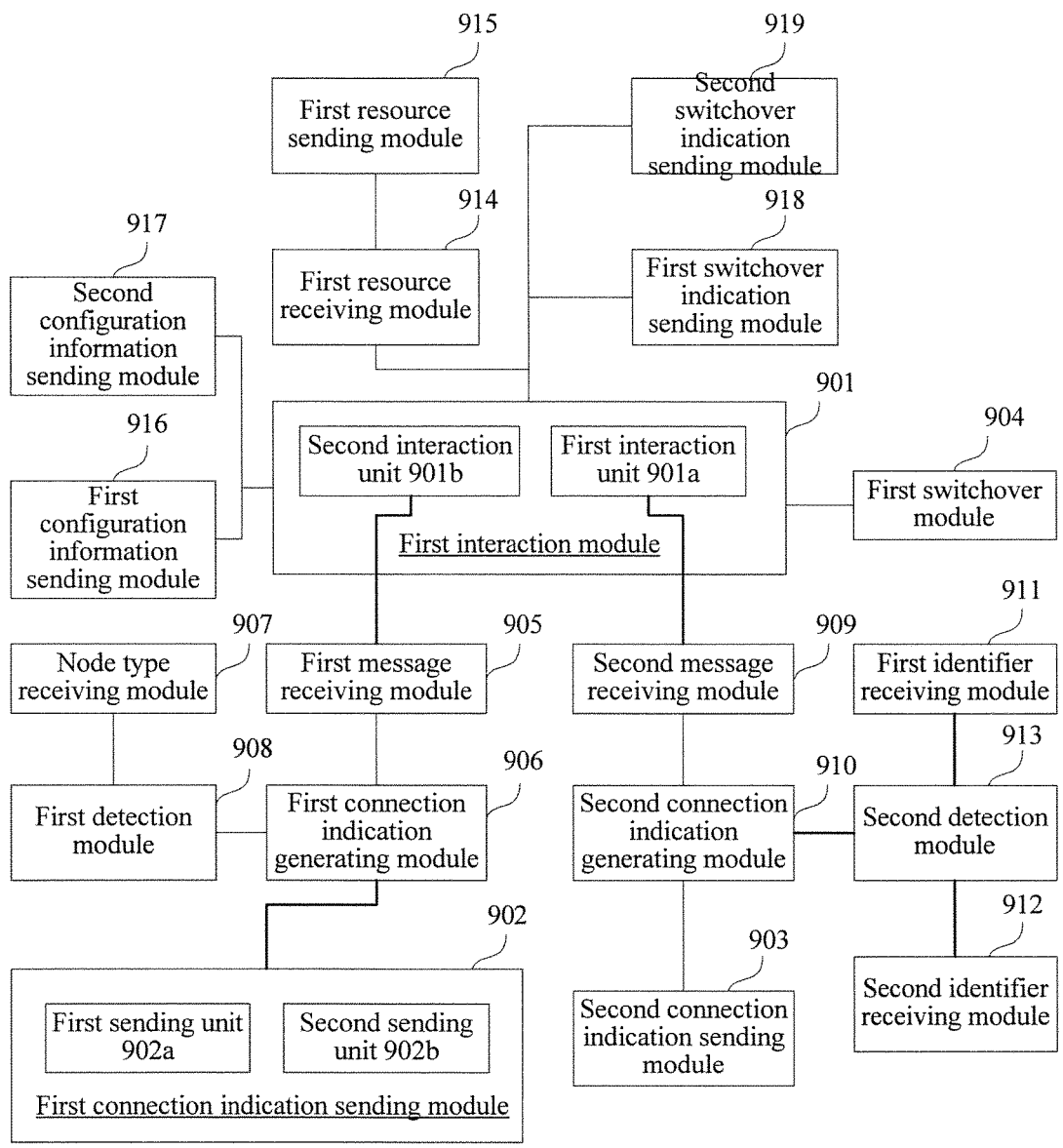
FIG. 9 is a device composition diagram of a first base station according to another embodiment of the present invention.

Based on a more preferable solution of the first base station shown in FIG. 8, refer to FIG. 9, which shows a device composition diagram of a first base station according to another embodiment of the present invention. The first base station may be an eNB or a DeNB, and the first base station may be implemented as the first base station in the method for establishing a backhaul link shown in FIG. 1 or FIG. 2. The first base station may include:

- a first interaction module 901, configured to perform interaction with a relay node, so as to establish at least one connection between the first base station and the relay node, where the relay node includes a first user equipment part and a second user equipment part, and the at least one connection includes a connection between the first base station and the first user equipment part;
- a first connection indication sending module 902, configured to send a first connection establishment indication to the relay node by using the at least one connection between the first base station and the relay node;
- a second connection indication sending module 903, configured to send a second connection establishment indication to a second base station by using an original connection between the first base station and the second base station, where the first connection establishment indication and the second connection establishment indication are separately used for instructing the relay node to perform interaction with the second base station, so as to establish a connection between the second user equipment part and the second base station, and the second base station switches the connection between the second user equipment part and the second base station over to a backhaul link; and
- a first switchover module 904, configured to switch the connection between the first base station and the first user equipment part over to a backhaul link.

The first interaction module 901 includes:

- a first interaction unit 901*a*, configured to perform first connection establishment interaction with the relay node, so as to establish a first connection, where the first connection is the connection between the first base station and the first user equipment part; and
- a second interaction unit 901*b*, configured to perform second connection establishment interaction with the relay node, so as to establish a second connection and a third connection, where the second connection is the connection between the first base station and the first user equipment part, and the third connection is a connection between the first base station and the second user equipment part.

The first base station further includes:
a first message receiving module 905, configured to: after the first interaction unit 901*a* performs the first connection establishment interaction with the relay node, so as to establish the first connection, receive, by using the first connection, an indication message sent by the relay node; and
a first connection indication generating module 906, configured to generate the first connection establishment indication and the second connection establishment indication according to the indication message received by the first message receiving module 905; and
the first connection indication sending module 902 includes:
a first sending unit 902*a*, configured to send the first connection establishment indication to the relay node by using the first connection.

The first base station further includes:
a node type receiving module 907, configured to: before the first connection indication generating module 906 generates the first connection establishment indication and the second connection establishment indication according to the indication message, receive, by using the first connection, a type identifier sent by the relay node, where the type identifier is used for indicating a type of the relay node; and
a first detection module 908, configured to detect according to the type identifier whether the type of the relay node conforms to a predetermined type; and
the first connection indication generating module 906 is configured to: if a detection result of the first detection module 908 is that the type of the relay node conforms to the predetermined type, perform the step of generating the first connection establishment indication and the second connection establishment indication according to the indication message.

The first base station further includes:
a second message receiving module 909, configured to: after the second interaction unit 901*b* performs the second connection establishment interaction with the relay node, so as to establish the second connection and the third connection, receive, by using the second connection or the third connection, an indication message sent by the relay node; and
a second connection indication generating module 910, configured to generate the first connection establishment indication and the second connection establishment indication according to the indication message received by the second message receiving module 909; and
the first connection indication sending module 902 includes:
a second sending unit 902*b*, configured to send the first connection establishment indication to the relay node by using the second connection or the third connection.

The first base station further includes:
a first identifier receiving module 911, configured to: before the second connection indication generating module 910 generates the first connection establishment indication and the second connection establishment indication according to the indication message, receive, by using the second connection, a first identifier sent by the relay node, where the first identifier is used for representing a relay node at which the first user equipment part is located;
a second identifier receiving module 912, configured to: before the second connection indication generating module 910 generates the first connection establishment indication and the second connection establishment indication according to the indication message, receive, by using the third connection, a second identifier sent by the relay node, where the second identifier is used for representing a relay node at which the second user equipment part is located; and
a second detection module 913, configured to detect whether the first identifier matches the second identifier; and
the second connection indication generating module 910 is configured to: if a detection result of the second detection module 913 is that the first identifier matches the second identifier, perform the step of generating the first connection establishment indication and the second connection establishment indication according to the indication message.

The first connection indication sending module 902 is configured to send the first connection establishment indication including the identifier of the second user equipment part and the identifier of the second base station to the relay node by using the at least one connection between the first base station and the relay node, where the relay node performs interaction with the second base station according to the identifier of the second user equipment part and the identifier of the second base station, so as to establish the connection between the second user equipment part and the second base station; and the second connection indication sending module 903 is configured to send the second connection establishment indication including the identifier of the second user equipment part to the second base station by using the original connection between the first base station and the second base station, where the second base station performs interaction with the relay node according to the identifier of the second user equipment part, so as to establish the connection between the second user equipment part and the second base station, where the indication message includes an identifier of the second user equipment part, or the indication message includes an identifier of the first user equipment part and an identifier of the second user equipment part; and the first base station stores an identifier of the second base station.

The first base station further includes:
a first resource receiving module 914, configured to receive, by using the original connection between the first base station and the second base station, an access channel resource sent by the second base station; and
a first resource sending module 915, configured to send the access channel resource to the relay node by using the at least one connection between the first base station and the relay node, where the relay node performs interaction with the second base station according to the access channel resource, so as to establish the connection between the second user equipment part and the second base station,
where the access channel resource includes an access channel preamble code preamble code.

The first base station further includes:
a first configuration information sending module 916, configured to send configuration information to the second base station by using the original connection between the first base station and the second base station, where the second base station configures the connection between the second user equipment part and the second base station according to the configuration information; and
a second configuration information sending module 917, configured to send configuration information to the relay node by using the at least one connection between the first base station and the relay node, where the relay node sends the configuration information to the second base station by using the connection between the second user equipment part and the second base station, and the second base station configures the connection between the second user equipment part and the second base station according to the configuration information.

The configuration information includes: radio bearer configuration information RBs configuration and/or subframe configuration information Subframe configuration.

The first base station further includes:
a first switchover indication sending module 918, configured to send a backhaul link switchover indication to the second base station by using the original connection between the first base station and the second base station, where the second base station switches the connection between the second user equipment part and the second base station over to a backhaul link according to the backhaul link switchover indication; and
a second switchover indication sending module 919, configured to send a backhaul link switchover indication to the relay node by using the at least one connection between the first base station and the relay node, where the relay node sends the backhaul link switchover indication to the second base station by using the connection between the second user equipment part and the second base station, and the second base station switches the connection between the second user equipment part and the second base station over to a backhaul link according to the backhaul link switchover indication.

To sum up, in the first base station provided in this embodiment of the present invention, by performing interaction with a relay node, at least one connection between the first base station and the relay node including a first user equipment part and a second user equipment part is established, a first connection establishment indication is sent to the first base station by using the established connection between the first base station and the relay node, and a second connection establishment indication is sent to the second base station by using an original connection between the first base station and a second base station, so that the relay node performs interaction with the second base station, so as to establish a connection between the second user equipment part and the second base station, and the second base station switches the connection between the second user equipment part and the second base station over to a backhaul link, and switches a connection between the first base station and the first user equipment part over to a backhaul link. This resolves the problem that the method provided in the prior art is only applicable to a relay node establishing a connection to a base station by using a UE part and an eNB part, but not applicable to an innovative relay node establishing a connection to a base station by using two UE parts, and achieves an objective that a backhaul link can be established by using the innovative relay node establishing a connection to a base station by using two UE parts.

Figure 10:
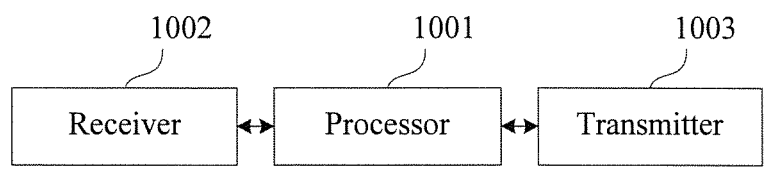
FIG. 10 is a device composition diagram of a first base station according to an embodiment of the present invention.

Refer to FIG. 10, which shows a device composition diagram of a first base station according to an embodiment of the present invention. The first base station may be implemented as the first base station in the method for establishing a backhaul link shown in FIG. 1 or FIG. 2. The first base station may include: a processor 1001, a receiver 1002 and a transmitter 1003, where
the processor 1001 is configured to control the receiver 1002 and the transmitter 1003 to perform interaction with a relay node, so as to establish at least one connection between the first base station and the relay node, where the relay node includes a first user equipment part and a second user equipment part, and the at least one connection includes a connection between the first base station and the first user equipment part;
the processor 1001 is configured to control the transmitter 1003 to send a first connection establishment indication to the relay node by using the at least one connection between the first base station and the relay node;
the processor 1001 is configured to control the transmitter 1003 to send a second connection establishment indication to a second base station by using an original connection between the first base station and the second base station, where the first connection establishment indication and the second connection establishment indication are separately used for instructing the relay node to perform interaction with the second base station, so as to establish a connection between the second user equipment part and the second base station, and the second base station switches the connection between the second user equipment part and the second base station over to a backhaul link; and
the processor 1001 is configured to switch the connection between the first base station and the first user equipment part over to a backhaul link.

To sum up, in the first base station provided in this embodiment of the present invention, by performing interaction with a relay node, at least one connection between the first base station and the relay node including a first user equipment part and a second user equipment part is established, a first connection establishment indication is sent to the first base station by using the established connection between the first base station and the relay node, and a second connection establishment indication is sent to the second base station by using an original connection between the first base station and a second base station, so that the relay node performs interaction with the second base station, so as to establish a connection between the second user equipment part and the second base station, and the second base station switches the connection between the second user equipment part and the second base station over to a backhaul link, and switches a connection between the first base station and the first user equipment part over to a backhaul link. This resolves the problem that the method provided in the prior art is only applicable to a relay node establishing a connection to a base station by using a UE part and an eNB part, but not applicable to an innovative relay node establishing a connection to a base station by using two UE parts, and achieves an objective that a backhaul link can be established by using the innovative relay node establishing a connection to a base station by using two UE parts.

Figure 11:
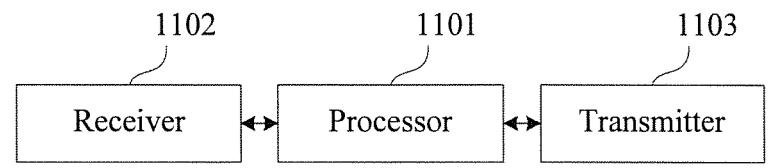
FIG. 11 is a device composition diagram of a first base station according to another embodiment of the present invention.

Based on a more preferable solution of the first base station shown in FIG. 10, refer to FIG. 11, which shows a device composition diagram of a first base station according to another embodiment of the present invention. The first base station may be implemented as the first base station in the method for establishing a backhaul link shown in FIG. 1 or FIG. 2. The first base station may include: a processor 1101, a receiver 1102 and a transmitter 1103, where the processor 1101 is configured to control the receiver 1102 and the transmitter 1103 to perform interaction with a relay node, so as to establish at least one connection between the first base station and the relay node, where the relay node includes a first user equipment part and a second user equipment part, and the at least one connection includes a connection between the first base station and the first user equipment part;

the processor 1101 is configured to control the transmitter 1103 to send a first connection establishment indication to the relay node by using the at least one connection between the first base station and the relay node;

the processor 1101 is configured to control the transmitter 1103 to send a second connection establishment indication to a second base station by using an original connection between the first base station and the second base station, where the first connection establishment indication and the second connection establishment indication are separately used for instructing the relay node to perform interaction with the second base station, so as to establish a connection between the second user equipment part and the second base station, and the second base station switches the connection between the second user equipment part and the second base station over to a backhaul link; and the processor 1101 is configured to switch the connection between the first base station and the first user equipment part over to a backhaul link.

The processor 1101 is configured to control the receiver 1102 and the transmitter 1103 to perform first connection establishment interaction with the relay node, so as to establish a first connection, where the first connection is the connection between the first base station and the first user equipment part; and the processor 1101 is configured to control the receiver 1102 and the transmitter 1103 to perform second connection establishment interaction with the relay node, so as to establish a second connection and a third connection, where the second connection is the connection between the first base station and the first user equipment part, and the third connection is a connection between the first base station and the second user equipment part.

The receiver 1102 is configured to: after the processor 1101 controls the receiver 1102 and the transmitter 1103 to perform the first connection establishment interaction with the relay node, so as to establish the first connection, receive, by using the first connection, an indication message sent by the relay node;

the processor 1101 is configured to generate the first connection establishment indication and the second connection establishment indication according to the indication message received by the receiver 1102; and the processor 1101 is configured to control the transmitter 1103 to send the first connection establishment indication to the relay node by using the first connection.

The receiver 1102 is configured to: before the processor 1101 generates the first connection establishment indication and the second connection establishment indication according to the indication message, receive, by using the first connection, a type identifier sent by the relay node, where the type identifier is used for indicating a type of the relay node;

the processor 1101 is configured to detect according to the type identifier whether the type of the relay node conforms to a predetermined type; and the processor 1101 is configured to: if a detection result is that the type of the relay node conforms to the predetermined type, perform the step of generating the first connection establishment indication and the second connection establishment indication according to the indication message.

The receiver 1102 is configured to: after the processor 1101 controls the receiver 1102 and the transmitter 1103 to perform the second connection establishment interaction with the relay node, so as to establish the second connection and the third connection, receive, by using the second connection or the third connection, an indication message sent by the relay node;

the processor 1101 is configured to generate the first connection establishment indication and the second connection establishment indication according to the indication message received by the receiver 1102; and the processor 1101 is configured to control the transmitter 1103 to send the first connection establishment indication to the relay node by using the second connection or the third connection.

The receiver 1102 is configured to: before the processor 1101 generates the first connection establishment indication and the second connection establishment indication according to the indication message, receive, by using the second connection, a first identifier sent by the relay node, where the first identifier is used for representing a relay node at which the first user equipment part is located, and receive, by using the third connection, a second identifier sent by the relay node, the second identifier used for representing a relay node at which the second user equipment part is located;

the processor 1101 is configured to detect whether the first identifier matches the second identifier; and the processor 1101 is configured to: if a detection result is that the first identifier matches the second identifier, perform the step of generating the first connection establishment indication and the second connection establishment indication according to the indication message.

The processor 1101 is configured to control the transmitter 1103 to send the first connection establishment indication including the identifier of the second user equipment part and the identifier of the second base station to the relay node by using the at least one connection between the first base station and the relay node, where the relay node performs interaction with the second base station according to the identifier of the second user equipment part and the identifier of the second base station, so as to establish the connection between the second user equipment part and the second base station; and the processor 1101 is configured to control the transmitter 1103 to send the second connection establishment indication including the identifier of the second user equipment part to the second base station by using the original connection between the first base station and the second base station, where the second base station performs interaction with the relay node according to the identifier of the second user equipment part, so as to establish the connection between the second user equipment part and the second base station, where the indication message includes an identifier of the second user equipment part, or the indication message includes an identifier of the first user equipment part and an identifier of the second user equipment part; and the first base station stores an identifier of the second base station.

The receiver 1102 is configured to receive, by using the original connection between the first base station and the second base station, an access channel resource sent by the second base station; and the processor 1101 is configured to control the transmitter 1103 to send the access channel resource to the relay node by using the at least one connection between the first base station and the relay node, where the relay node performs interaction with the second base station according to the access channel resource, so as to establish the connection between the second user equipment part and the second base station, where the access channel resource includes an access channel preamble code preamble code.

The processor 1101 is configured to control the transmitter 1103 to send configuration information to the second base station by using the original connection between the first base station and the second base station, where the second base station configures the connection between the second user equipment part and the second base station according to the configuration information; and the processor 1101 is configured to control the transmitter 1103 to send configuration information to the relay node by using the at least one connection between the first base station and the relay node, where the relay node sends the configuration information to the second base station by using the connection between the second user equipment part and the second base station, and the second base station configures the connection between the second user equipment part and the second base station according to the configuration information.

The configuration information includes: radio bearer configuration information RBs configuration and/or subframe configuration information Subframe configuration.

The processor 1101 is configured to control the transmitter 1103 to send a backhaul link switchover indication to the second base station by using the original connection between the first base station and the second base station, where the second base station switches the connection between the second user equipment part and the second base station over to a backhaul link according to the backhaul link switchover indication; or the processor 1101 is configured to control the transmitter 1103 to send a backhaul link switchover indication to the relay node by using the at least one connection between the first base station and the relay node, where the relay node sends the backhaul link switchover indication to the second base station by using the connection between the second user equipment part and the second base station, and the second base station switches the connection between the second user equipment part and the second base station over to a backhaul link according to the backhaul link switchover indication.

To sum up, in the first base station provided in this embodiment of the present invention, by performing interaction with a relay node, at least one connection between the first base station and the relay node including a first user equipment part and a second user equipment part is established, a first connection establishment indication is sent to the first base station by using the established connection between the first base station and the relay node, and a second connection establishment indication is sent to the second base station by using an original connection between the first base station and a second base station, so that the relay node performs interaction with the second base station, so as to establish a connection between the second user equipment part and the second base station, and the second base station switches the connection between the second user equipment part and the second base station over to a backhaul link, and switches a connection between the first base station and the first user equipment part over to a backhaul link. This resolves the problem that the method provided in the prior art is only applicable to a relay node establishing a connection to a base station by using a UE part and an eNB part, but not applicable to an innovative relay node establishing a connection to a base station by using two UE parts, and achieves an objective that a backhaul link can be established by using the innovative relay node establishing a connection to a base station by using two UE parts.

Figure 12:
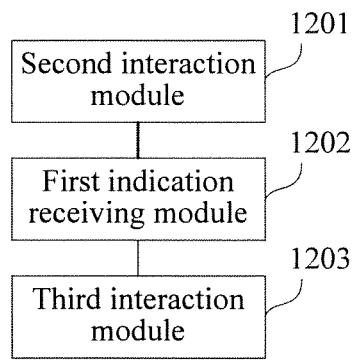
FIG. 12 is a device composition diagram of a relay node according to an embodiment of the present invention.

Refer to FIG. 12, which shows a device composition diagram of a relay node according to an embodiment of the present invention. The relay node includes a first user equipment part and a second user equipment part, and the relay device may be implemented as the relay device in the method for establishing a backhaul link shown in FIG. 3 or FIG. 4. The relay node may include:

a second interaction module 1201, configured to perform interaction with a first base station, so as to establish at least one connection between the relay node and the first base station, where the at least one connection includes a connection between the first user equipment part and the first base station, and the first base station switches the connection between the first user equipment part and the first base station over to a backhaul link;

a first indication receiving module 1202, configured to receive, by using the at least one connection between the relay node and the first base station, a first connection establishment indication sent by the first base station; and a third interaction module 1203, configured to perform interaction with the second base station according to the first connection establishment indication, so as to establish a connection between the second user equipment part and the second base station, where the second base station switches the connection between the second user equipment part and the second base station over to a backhaul link.

To sum up, in the relay node provided in this embodiment of the present invention, interaction with a first base station is first performed, a connection between a first user equipment part and the first base station is established, interaction with a second base station is performed according to an indication sent by the first base station, a connection between a second user equipment part and the second base station is established, and the first base station and the second base station switch the established connections over to backhaul links. This resolves the problem that the method provided in the prior art is only applicable to a relay node establishing a connection to a base station by using a UE part and an eNB part, but not applicable to an innovative relay node establishing a connection to a base station by using two UE parts, and achieves an objective that a backhaul link can be established by using the innovative relay node establishing a connection to a base station by using two UE parts.

Figure 13:
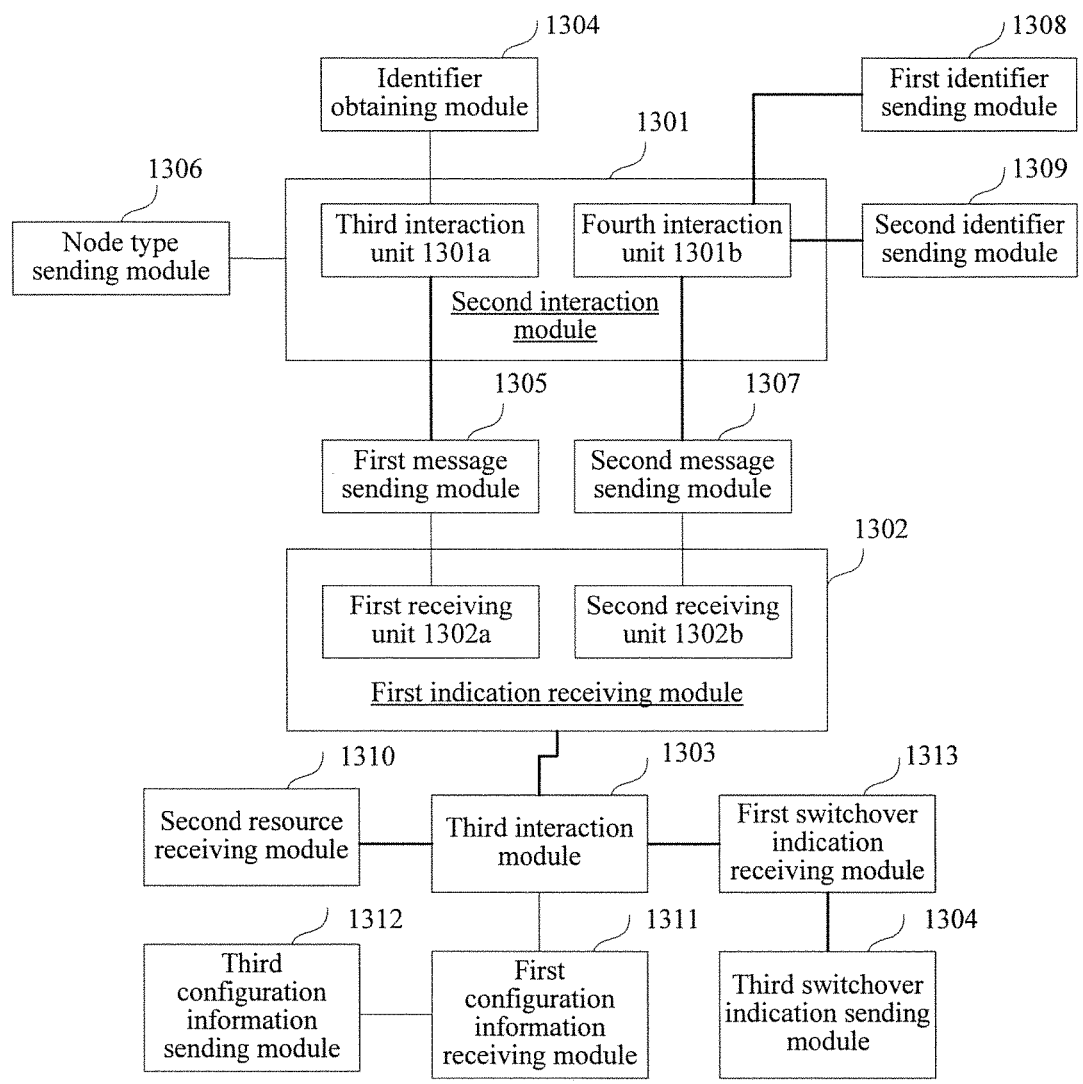
FIG. 13 is a device composition diagram of a relay node according to another embodiment of the present invention.

Based on a more preferable solution of the relay node shown in FIG. 12, refer to FIG. 13, which shows a device composition diagram of a relay node according to another embodiment of the present invention. The relay node includes a first user equipment part and a second user equipment part, and the relay device may be implemented as the relay device in the method for establishing a backhaul link shown in FIG. 3 or FIG. 4. The relay node may include:

a second interaction module 1301, configured to perform interaction with a first base station, so as to establish at least one connection between the relay node and the first base station, where the at least one connection includes a connection between the first user equipment part and the first base station, and the first base station switches the connection between the first user equipment part and the first base station over to a backhaul link;

a first indication receiving module 1302, configured to receive, by using the at least one connection between the relay node and the first base station, a first connection establishment indication sent by the first base station; and a third interaction module 1303, configured to perform interaction with the second base station according to the first connection establishment indication, so as to establish a connection between the second user equipment part and the second base station, where the second base station switches the connection between the second user equipment part and the second base station over to a backhaul link.

The relay node further includes:

an identifier obtaining module 1304, configured to: before the second interaction module 1301 performs interaction with the first base station, so as to establish the at least one connection between the relay node and the first base station, obtain an identifier of the first base station from an operations, administration and maintenance device; and the second interaction module 1301 is configured to perform interaction with the first base station according to the identifier of the first base station obtained by the identifier obtaining module 1304.

The second interaction module 1301 includes:

a third interaction unit 1301a, configured to perform first connection establishment interaction with the first base station, so as to establish a first connection, where the first connection is the connection between the first user equipment part and the first base station; and a fourth interaction unit 1301b, configured to perform second connection establishment interaction with the first base station, so as to establish a second connection and a third connection, where the second connection is the connection between the first user equipment part and the first base station, and the third connection is a connection between the second user equipment part and the first base station.

The relay node further includes:

a first message sending module 1305, configured to: after the third interaction unit 1301a performs first connection establishment interaction with the first base station, so as to establish the first connection, send an indication message to the first base station by using the first connection, where the first base station generates the first connection establishment indication according to the indication message; and the first indication receiving module 1302 includes:

a first receiving unit 1302a, configured to receive the first connection establishment indication by using the first connection.

The relay node further includes:

a node type sending module 1306, configured to send a type identifier to the first base station by using the first connection, where the type identifier is used for indicating a type of the relay node, and after detecting according to the type identifier that the type of the relay node conforms to a predetermined type, the first base station performs the step of generating the first connection establishment indication according to the indication message.

The relay node further includes:

a second message sending module 1307, configured to: after the fourth interaction unit 1301b performs second connection establishment interaction with the first base station, so as to establish the second connection and the third connection, send an indication message to the second base station by using the second connection or the third connection, where the first base station generates the first connection establishment indication according to the indication message; and the first indication receiving module 1302 includes:

a second receiving unit 1302b, configured to receive the first connection establishment indication by using the second connection or the third connection.

The relay node further includes:

a first identifier sending module 1308, configured to send a first identifier to the first base station by using the second connection, where the first identifier is used for representing a relay node at which the first user equipment part is located; and a second identifier sending module 1309, configured to send a second identifier to the first base station by using the third connection, where the second identifier is used for representing a relay node at which the second user equipment part is located, and after detecting that the first identifier matches the second identifier, the first base station performs the step of generating the first connection establishment indication according to the indication message.

The third interaction module 1303 is configured to perform interaction with the second base station according to the identifier of the second user equipment part and the identifier of the second base station, so as to establish the connection between the second user equipment part and the second base station; and the indication message includes an identifier of the second user equipment part, or the indication message includes an identifier of the first user equipment part and an identifier of the second user equipment part; and the first connection establishment indication includes the identifier of the second user equipment part and an identifier of the second base station.

The relay node further includes:

a second resource receiving module 1310, configured to receive, by using the at least one connection between the relay node and the first base station, an access channel resource sent by the first base station, where the access channel resource is sent by the second base station to the first base station by using an original connection between the first base station and the second base station; and the third interaction module 1303 is configured to perform interaction with the second base station according to the access channel resource, so as to establish the connection between the second user equipment part and the second base station, where the access channel resource includes an access channel preamble code preamble code.

The relay node further includes:
a first configuration information receiving module 1311, configured to receive, by using the at least one connection between the relay node and the first base station, configuration information sent by the first base station; and
a third configuration information sending module 1312, configured to send the configuration information to the second base station by using the connection between the second user equipment part and the second base station, where the second base station configures the connection between the second user equipment part and the second base station according to the configuration information.

The configuration information includes: radio bearer configuration information RBs configuration and/or subframe configuration information Subframe configuration.

The relay node further includes:
a first switchover indication receiving module 1313, configured to receive, by using the at least one connection between the relay node and the first base station, the backhaul link switchover indication sent by the first base station; and
a third switchover indication sending module 1314, configured to send the backhaul link switchover indication to the second base station by using the connection between the second user equipment part and the second base station, where the second base station switches the connection between the second user equipment part and the second base station over to a backhaul link according to the backhaul link switchover indication.

To sum up, in the relay node provided in this embodiment of the present invention, interaction with a first base station is first performed, a connection between a first user equipment part and the first base station is established, interaction with a second base station is performed according to an indication sent by the first base station, a connection between a second user equipment part and the second base station is established, and the first base station and the second base station switch the established connections over to backhaul links. This resolves the problem that the method provided in the prior art is only applicable to a relay node establishing a connection to a base station by using a UE part and an eNB part, but not applicable to an innovative relay node establishing a connection to a base station by using two UE parts, and achieves an objective that a backhaul link can be established by using the innovative relay node establishing a connection to a base station by using two UE parts.

Figure 14:
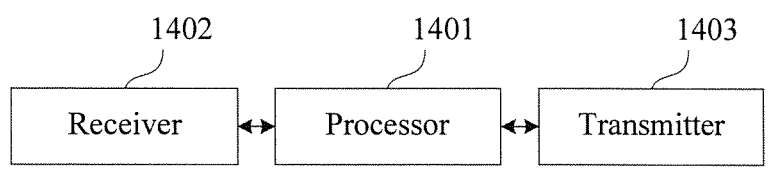
FIG. 14 is a device composition diagram of a relay node according to an embodiment of the present invention.

Refer to FIG. 14, which shows a device composition diagram of a relay node according to an embodiment of the present invention. The relay node includes a first user equipment part and a second user equipment part. The relay device may be implemented as the relay device in the method for establishing a backhaul link shown in FIG. 3 or FIG. 4. The relay node may include: a processor 1401, a receiver 1402 and a transmitter 1403, where
the processor 1401 is configured to control the receiver 1402 and the transmitter 1403 to perform interaction with a first base station, so as to establish at least one connection between the relay node and the first base station, where the at least one connection includes a connection between the first user equipment part and the first base station, and the first base station switches the connection between the first user equipment part and the first base station over to a backhaul link;
the receiver 1402 is configured to receive, by using the at least one connection between the relay node and the first base station, a first connection establishment indication sent by the first base station; and
the processor 1401 is configured to control the receiver 1402 and the transmitter 1403 to perform interaction with the second base station according to the first connection establishment indication, so as to establish a connection between the second user equipment part and the second base station, where the second base station switches the connection between the second user equipment part and the second base station over to a backhaul link.

To sum up, in the relay node provided in this embodiment of the present invention, interaction with a first base station is first performed, a connection between a first user equipment part and the first base station is established, interaction with a second base station is performed according to an indication sent by the first base station, a connection between a second user equipment part and the second base station is established, and the first base station and the second base station switch the established connections over to backhaul links. This resolves the problem that the method provided in the prior art is only applicable to a relay node establishing a connection to a base station by using a UE part and an eNB part, but not applicable to an innovative relay node establishing a connection to a base station by using two UE parts, and achieves an objective that a backhaul link can be established by using the innovative relay node establishing a connection to a base station by using two UE parts.

Figure 15:
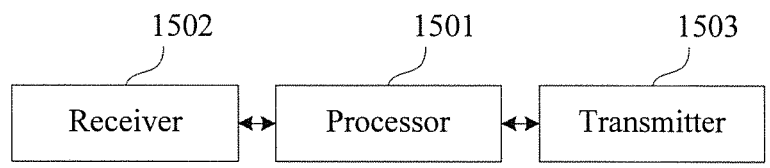
FIG. 15 is a device composition diagram of a relay node according to another embodiment of the present invention.

Based on a more preferable solution of the relay node shown in FIG. 14, refer to FIG. 15, which shows a device composition diagram of a relay node according to another embodiment of the present invention. The relay node includes a first user equipment part and a second user equipment part. The relay device may be implemented as the relay device in the method for establishing a backhaul link shown in FIG. 3 or FIG. 4. The relay node may include: a processor 1501, a receiver 1502 and a transmitter 1503, where
the processor 1501 is configured to control the receiver 1502 and the transmitter 1503 to perform interaction with a first base station, so as to establish at least one connection between the relay node and the first base station, where the at least one connection includes a connection between the first user equipment part and the first base station, and the first base station switches the connection between the first user equipment part and the first base station over to a backhaul link;
the receiver 1502 is configured to receive, by using the at least one connection between the relay node and the first base station, a first connection establishment indication sent by the first base station; and
the processor 1501 is configured to control the receiver 1502 and the transmitter 1503 to perform interaction with the second base station according to the first connection establishment indication, so as to establish a connection between the second user equipment part and the second base station, where the second base station switches the connection between the second user equipment part and the second base station over to a backhaul link.

The processor 1501 is configured to: before controlling the receiver 1502 and the transmitter 1503 to perform interaction with the first base station, so as to establish the at least one connection between the relay node and the first base station, control the receiver 1502 and the transmitter 1503 to obtain an identifier of the first base station from an operations, administration and maintenance device; and the processor 1501 is configured to control the receiver 1502 and the transmitter 1503 to perform interaction with the first base station according to the obtained identifier of the first base station.

The processor 1501 is configured to control the receiver 1502 and the transmitter 1503 to perform first connection establishment interaction with the first base station, so as to establish a first connection, where the first connection is the connection between the first user equipment part and the first base station; and the processor 1501 is configured to control the receiver 1502 and the transmitter 1503 to perform second connection establishment interaction with the first base station, so as to establish a second connection and a third connection, where the second connection is the connection between the first user equipment part and the first base station, and the third connection is a connection between the second user equipment part and the first base station.

The processor 1501 is configured to: after controlling the receiver 1502 and the transmitter 1503 to perform first connection establishment interaction with the first base station, so as to establish the first connection, control the transmitter 1503 to send an indication message to the first base station by using the first connection, where the first base station generates the first connection establishment indication according to the indication message; and the receiver 1502 is configured to receive the first connection establishment indication by using the first connection.

The processor 1501 is configured to control the transmitter 1503 to send a type identifier to the first base station by using the first connection, where the type identifier is used for indicating a type of the relay node, and after detecting according to the type identifier that the type of the relay node conforms to a predetermined type, the first base station performs the step of generating the first connection establishment indication according to the indication message.

The processor 1501 is configured to: after controlling the receiver 1502 and the transmitter 1503 to perform second connection establishment interaction with the first base station, so as to establish the second connection and the third connection, control the transmitter 1503 to send an indication message to the second base station by using the second connection or the third connection, where the first base station generates the first connection establishment indication according to the indication message; and
 the receiver 1502 is configured to receive the first connection establishment indication by using the second connection or the third connection.

The processor 1501 is configured to control the transmitter 1503 to send a first identifier to the first base station by using the second connection, where the first identifier is used for representing a relay node at which the first user equipment part is located; and
 the processor 1501 is configured to control the transmitter 1503 to send a second identifier to the first base station by using the third connection, where the second identifier is used for representing a relay node at which the second user equipment part is located, and after detecting that the first identifier matches the second identifier, the first base station performs the step of generating the first connection establishment indication according to the indication message.

The processor is configured to control the receiver 1502 and the transmitter 1503 to perform interaction with the second base station according to the identifier of the second user equipment part and the identifier of the second base station, so as to establish the connection between the second user equipment part and the second base station; and
 the indication message includes an identifier of the second user equipment part, or the indication message includes an identifier of the first user equipment part and an identifier of the second user equipment part; and the first connection establishment indication includes the identifier of the second user equipment part and an identifier of the second base station.

The receiver 1502 is configured to receive, by using the at least one connection between the relay node and the first base station, an access channel resource sent by the first base station, where the access channel resource is sent by the second base station to the first base station by using an original connection between the first base station and the second base station; and
 the processor 1501 is configured to control the receiver 1502 and the transmitter 1503 to perform interaction with the second base station according to the access channel resource, so as to establish the connection between the second user equipment part and the second base station,
 where the access channel resource includes an access channel preamble code preamble code.

The receiver 1502 is configured to receive, by using the at least one connection between the relay node and the first base station, configuration information sent by the first base station; and
 the processor 1501 is configured to control the transmitter 1503 to send the configuration information to the second base station by using the connection between the second user equipment part and the second base station, where the second base station configures the connection between the second user equipment part and the second base station according to the configuration information.

The configuration information includes: radio bearer configuration information RBs configuration and/or subframe configuration information Subframe configuration.

The receiver 1502 is configured to receive, by using the at least one connection between the relay node and the first base station, the backhaul link switchover indication sent by the first base station; and
 the processor 1501 is configured to control the transmitter 1503 to send the backhaul link switchover indication to the second base station by using the connection between the second user equipment part and the second base station, where the second base station switches the connection between the second user equipment part and the second base station over to a backhaul link according to the backhaul link switchover indication.

To sum up, in the relay node provided in this embodiment of the present invention, interaction with a first base station is first performed, a connection between a first user equipment part and the first base station is established, interaction with a second base station is performed according to an indication sent by the first base station, a connection between a second user equipment part and the second base station is established, and the first base station and the second base station switch the established connections over to backhaul links. This resolves the problem that the method provided in the prior art is only applicable to a relay node establishing a connection to a base station by using a UE part and an eNB part, but not applicable to an innovative relay node establishing a connection to a base station by using two UE parts, and achieves an objective that a backhaul link can be established by using the innovative relay node establishing a connection to a base station by using two UE parts.

Figure 16:
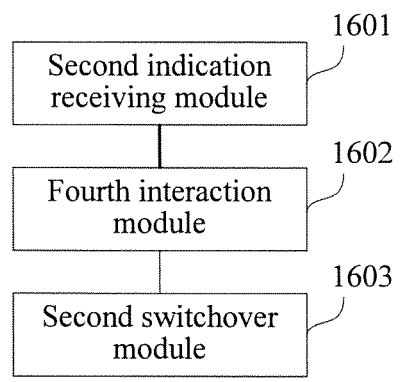
FIG. 16 is a device composition diagram of a second base station according to an embodiment of the present invention.

Refer to FIG. 16, which shows a device composition diagram of a second base station according to an embodiment of the present invention. The second base station may be implemented as the second base station in the method for establishing a backhaul link shown in FIG. 5 or FIG. 6. The second base station may include:

a second indication receiving module 1601, configured to receive a second connection establishment indication that is sent by a first base station by using an original connection between the first base station and the second base station, where the second connection establishment indication is sent by the first base station after performing interaction with a relay node to establish at least one connection between the first base station and the relay node, the relay node includes a first user equipment part and a second user equipment part, the at least one connection between the first base station and the relay node includes a connection between the first base station and the first user equipment part, and the first base station switches the connection between the first base station and the first user equipment part over to a backhaul link;

a fourth interaction module 1602, configured to perform interaction with the relay node according to the second connection establishment indication, so as to establish a connection between the second base station and the second user equipment part; and a second switchover module 1603, configured to switch the connection between the second base station and the second user equipment part over to a backhaul link.

To sum up, in the second base station provided in this embodiment of the present invention, a second connection establishment indication that is sent by a first base station by using an original connection between the first base station and a second base station is received, interaction with a relay node including a first user equipment part and a second user equipment part is performed according to the second connection establishment indication, so as to establish a connection between the second base station and the second user equipment part, and a backhaul link is switched over to the connection between the second base station and the second user equipment part. This resolves the problem that the method provided in the prior art is only applicable to a relay node establishing a connection to a base station by using a UE part and an eNB part, but not applicable to an innovative relay node establishing a connection to a base station by using two UE parts, and achieves an objective that a backhaul link can be established by using the innovative relay node establishing a connection to a base station by using two UE parts.

Figure 17:
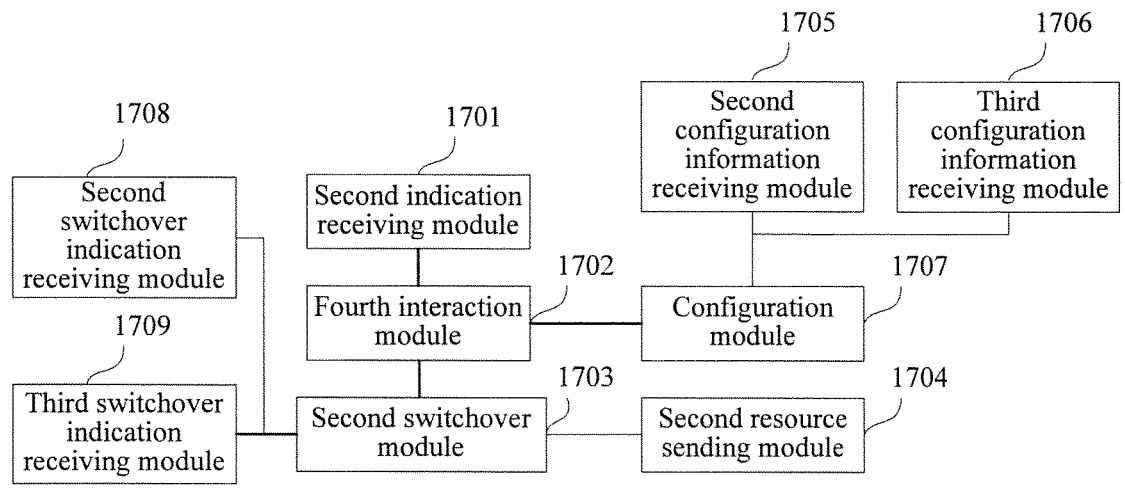
FIG. 17 is a device composition diagram of a second base station according to another embodiment of the present invention.

Based on a more preferable solution of the second base station shown in FIG. 16, refer to FIG. 17, which shows a device composition diagram of a second base station according to another embodiment of the present invention. The second base station may be implemented as the second base station in the method for establishing a backhaul link shown in FIG. 5 or FIG. 6. The second base station may include:

a second indication receiving module 1701, configured to receive a second connection establishment indication that is sent by a first base station by using an original connection between the first base station and the second base station, where the second connection establishment indication is sent by the first base station after performing interaction with a relay node to establish at least one connection between the first base station and the relay node, the relay node includes a first user equipment part and a second user equipment part, the at least one connection between the first base station and the relay node includes a connection between the first base station and the first user equipment part, and the first base station switches the connection between the first base station and the first user equipment part over to a backhaul link;

a fourth interaction module 1702, configured to perform interaction with the relay node according to the second connection establishment indication, so as to establish a connection between the second base station and the second user equipment part; and a second switchover module 1703, configured to switch the connection between the second base station and the second user equipment part over to a backhaul link.

The fourth interaction module 1702 is configured to perform interaction with the relay node according to the identifier of the second user equipment part, so as to establish the connection between the second base station and the second user equipment part; and the second connection establishment indication includes the identifier of the second user equipment part.

The second base station further includes:

a second resource sending module 1704, configured to send a channel resource to the first base station by using the original connection between the first base station and the second base station, where the first base station sends the channel resource to the relay node by using at least one connection between the first base station and the first user equipment part, and the relay node performs interaction with the second base station according to the channel resource, so as to establish the connection between the second base station and the second user equipment part, where the access channel resource includes an access channel preamble code preamble code.

The second base station further includes:

a second configuration information receiving module 1705, configured to receive configuration information that is sent by the first base station by using the original connection between the first base station and the second base station;

a third configuration information receiving module 1706, configured to receive configuration information that is sent by the relay node by using the connection between the second base station and the second user equipment part, where the configuration information is sent by the first base station to the relay node by using the at least one connection between the first base station and the first user equipment part; and a configuration module 1707, configured to: after the fourth interaction module 1702 performs interaction with the relay node according to the second connection establishment indication, so as to establish the connection between the second base station and the second user equipment part, configure the connection between the second base station and the second user equipment part according to the configuration information.

The configuration information includes: radio bearer configuration information RBs configuration and/or subframe configuration information Subframe configuration.

The second base station further includes:

a second switchover indication receiving module 1708, configured to receive a backhaul link switchover indication that is sent by the first base station by using the original connection between the first base station and the second base station; and a third switchover indication receiving module 1709, configured to receive a backhaul link switchover indication that is sent by the relay node by using the connection between the second base station and the second user equipment part, where the backhaul link switchover indication is sent by the first base station to the relay node by using the at least one connection between the first base station and the first user equipment part; and the second switchover module 1703 is configured to switch the connection between the second user equipment part and the second base station over to a backhaul link according to the backhaul link switchover indication.

To sum up, in the second base station provided in this embodiment of the present invention, a second connection establishment indication that is sent by a first base station by using an original connection between the first base station and a second base station is received, interaction with a relay node including a first user equipment part and a second user equipment part is performed according to the second connection establishment indication, so as to establish a connection between the second base station and the second user equipment part, and a backhaul link is switched over to the connection between the second base station and the second user equipment part. This resolves the problem that the method provided in the prior art is only applicable to a relay node establishing a connection to a base station by using a UE part and an eNB part, but not applicable to an innovative relay node establishing a connection to a base station by using two UE parts, and achieves an objective that a backhaul link can be established by using the innovative relay node establishing a connection to a base station by using two UE parts.

Figure 18:
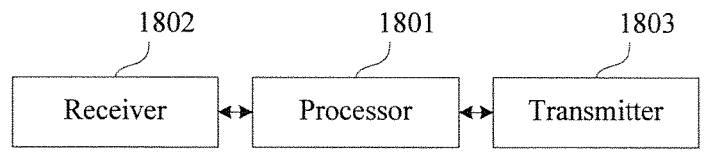
FIG. 18 is a device composition diagram of a second base station according to an embodiment of the present invention.

Refer to FIG. 18, which shows a device composition diagram of a second base station according to an embodiment of the present invention. The second base station may be implemented as the second base station in the method for establishing a backhaul link shown in FIG. 5 or FIG. 6. The second base station may include: a processor 1801, a receiver 1802 and a transmitter 1803, where the receiver 1802 is configured to receive a second connection establishment indication that is sent by a first base station by using an original connection between the first base station and the second base station, where the second connection establishment indication is sent by the first base station after performing interaction with a relay node to establish at least one connection between the first base station and the relay node, the relay node includes a first user equipment part and a second user equipment part, the at least one connection between the first base station and the relay node includes a connection between the first base station and the first user equipment part, and the first base station switches the connection between the first base station and the first user equipment part over to a backhaul link;

the processor 1801 is configured to control the receiver 1802 and the transmitter 1803 to perform interaction with the relay node according to the second connection establishment indication, so as to establish a connection between the second base station and the second user equipment part; and the processor 1801 is configured to switch the connection between the second base station and the second user equipment part over to a backhaul link.

To sum up, in the second base station provided in this embodiment of the present invention, a second connection establishment indication that is sent by a first base station by using an original connection between the first base station and a second base station is received, interaction with a relay node including a first user equipment part and a second user equipment part is performed according to the second connection establishment indication, so as to establish a connection between the second base station and the second user equipment part, and a backhaul link is switched over to the connection between the second base station and the second user equipment part. This resolves the problem that the method provided in the prior art is only applicable to a relay node establishing a connection to a base station by using a UE part and an eNB part, but not applicable to an innovative relay node establishing a connection to a base station by using two UE parts, and achieves an objective that a backhaul link can be established by using the innovative relay node establishing a connection to a base station by using two UE parts.

Figure 19:
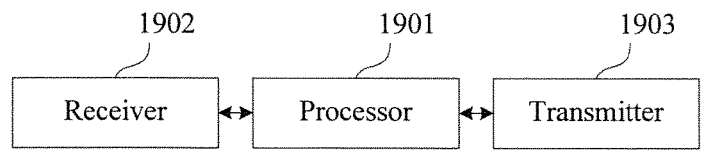
FIG. 19 is a device composition diagram of a second base station according to another embodiment of the present invention.

Based on a more preferable solution of the second base station shown in FIG. 18, refer to FIG. 19, which shows a device composition diagram of a second base station according to another embodiment of the present invention. The second base station may be implemented as the second base station in the method for establishing a backhaul link shown in FIG. 5 or FIG. 6. The second base station may include: a processor 1901, a receiver 1902 and a transmitter 1903, where the receiver 1902 is configured to receive a second connection establishment indication that is sent by a first base station by using an original connection between the first base station and the second base station, where the second connection establishment indication is sent by the first base station after performing interaction with a relay node to establish at least one connection between the first base station and the relay node, the relay node includes a first user equipment part and a second user equipment part, the at least one connection between the first base station and the relay node includes a connection between the first base station and the first user equipment part, and the first base station switches the connection between the first base station and the first user equipment part over to a backhaul link;

the processor 1901 is configured to control the receiver 1902 and the transmitter 1903 to perform interaction with the relay node according to the second connection establishment indication, so as to establish a connection between the second base station and the second user equipment part; and the processor 1901 is configured to switch the connection between the second base station and the second user equipment part over to a backhaul link.

The processor 1901 is configured to control the receiver 1902 and the transmitter 1903 to perform interaction with the relay node according to the identifier of the second user equipment part, so as to establish the connection between the second base station and the second user equipment part; and the second connection establishment indication includes the identifier of the second user equipment part.

The processor 1901 is configured to control the transmitter 1903 to send a channel resource to the first base station by using the original connection between the first base station and the second base station, where the first base station sends the channel resource to the relay node by using at least one connection between the first base station and the first user equipment part, and the relay node performs interaction with the second base station according to the channel resource, so as to establish the connection between the second base station and the second user equipment part,
where the access channel resource includes an access channel preamble code preamble code.

The receiver 1902 is configured to receive configuration information that is sent by the first base station by using the original connection between the first base station and the second base station;

the receiver 1902 is configured to receive configuration information that is sent by the relay node by using the connection between the second base station and the second user equipment part, where the configuration information is sent by the first base station to the relay node by using the at least one connection between the first base station and the first user equipment part; and the processor 1901 is configured to: after controlling the receiver 1902 and the transmitter 1903 to perform interaction with the relay node according to the second connection establishment indication, so as to establish the connection between the second base station and the second user equipment part, configure the connection between the second base station and the second user equipment part according to the configuration information.

The configuration information includes: radio bearer configuration information RBs configuration and/or subframe configuration information Subframe configuration.

The receiver 1902 is configured to receive a backhaul link switchover indication that is sent by the first base station by using the original connection between the first base station and the second base station;

the receiver 1902 is configured to receive a backhaul link switchover indication that is sent by the relay node by using the connection between the second base station and the second user equipment part, where the backhaul link switchover indication is sent by the first base station to the relay node by using the at least one connection between the first base station and the first user equipment part; and the processor 1901 is configured to switch the connection between the second user equipment part and the second base station over to a backhaul link according to the backhaul link switchover indication.

To sum up, in the second base station provided in this embodiment of the present invention, a second connection establishment indication that is sent by a first base station by using an original connection between the first base station and a second base station is received, interaction with a relay node including a first user equipment part and a second user equipment part is performed according to the second connection establishment indication, so as to establish a connection between the second base station and the second user equipment part, and a backhaul link is switched over to the connection between the second base station and the second user equipment part. This resolves the problem that the method provided in the prior art is only applicable to a relay node establishing a connection to a base station by using a UE part and an eNB part, but not applicable to an innovative relay node establishing a connection to a base station by using two UE parts, and achieves an objective that a backhaul link can be established by using the innovative relay node establishing a connection to a base station by using two UE parts.

Figure 20:
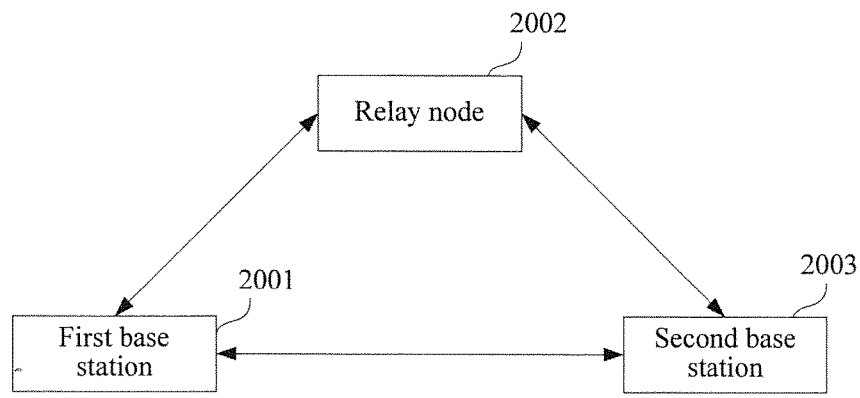
FIG. 20 is a system composition diagram of a system for establishing a backhaul link according to an embodiment of the present invention.

Refer to FIG. 20, which shows a system composition diagram of a system for establishing a backhaul link according to an embodiment of the present invention. The system for establishing a backhaul link may include: a first base station 2001 according to what is shown in any one of FIG. 8 to FIG. 11, a relay node 2002 according to what is shown in any one of FIG. 12 to FIG. 15 and a second base station 2003 according to what is shown in any one of FIG. 16 to FIG. 19.

To sum up, in the system for establishing a backhaul link provided in this embodiment of the present invention, a relay node first performs interaction with a first base station, so as to establish a connection between a first user equipment part and the first base station, and then performs interaction with a second base station, so as to establish a connection between a second user equipment part and the second base station, and the first base station and the second base station switch the established connections over to backhaul links. This resolves the problem that the method provided in the prior art is only applicable to a relay node establishing a connection to a base station by using a UE part and an eNB part, but not applicable to an innovative relay node establishing a connection to a base station by using two UE parts, and achieves an objective that a backhaul link can be established by using the innovative relay node establishing a connection to a base station by using two UE parts.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A method for establishing a backhaul link for use with a first base station, the method comprising:
performing, by the first base station, interaction with a relay node to establish at least one connection between the first base station and the relay node, wherein the relay node comprises a first user equipment part and a second user equipment part, and the at least one connection comprises a first radio resource control (RRC) connection between the first base station and the first user equipment part;
sending, by the first base station, a first connection establishment indication to the relay node by using the at least one connection between the first base station and the relay node, and sending a second connection establishment indication to a second base station by using an original connection between the first base station and the second base station, the first connection establishment indication for instructing the relay node to perform interaction with the second base station for establishing a second RRC connection between the second user equipment part and the second base station and for switching the second RRC connection between the second user equipment part and the second base station over to a backhaul link; and switching, by the first base station, the first RRC connection between the first base station and the first user equipment part over to a backhaul link;
wherein performing interaction with a relay node to establish at least one connection between the first base station and the relay node comprises:
performing first connection establishment interaction with the relay node to establish a first connection, wherein the first connection is the first RRC connection between the first base station and the first user equipment part; or
performing second connection establishment interaction with the relay node to establish a second connection and a third connection, wherein the second connection is the first RRC connection between the first base station and the first user equipment part, and the third connection is a third RRC connection between the first base station and the second user equipment part;
wherein, after performing first connection establishment interaction with the relay node to establish a first connection, the method further comprises:
  receiving, by using the first connection, an indication message sent by the relay node, and
  generating the first connection establishment indication and the second connection establishment indication according to the indication message; and
sending a first connection establishment indication to the relay node by using the at least one connection between the first base station and the relay node comprises:
  sending the first connection establishment indication to the relay node by using the first connection; and
wherein before generating the first connection establishment indication and the second connection establishment indication according to the indication message, the method further comprises:
receiving, by using the first connection, a type identifier sent by the relay node for indicating a type of the relay node;
detecting according to the type identifier whether the type of the relay node conforms to a predetermined type; and
  when a detection result is that the type of the relay node conforms to the predetermined type, performing generating the first connection establishment indication and the second connection establishment indication according to the indication message.

2. The method according to claim 1, wherein:
after performing second connection establishment interaction with the relay node to establish a second connection and a third connection, the method further comprises:
  receiving, by using the second connection or the third connection, an indication message sent by the relay node, and
  generating the first connection establishment indication and the second connection establishment indication according to the indication message; and
sending a first connection establishment indication to the relay node by using the at least one connection between the first base station and the relay node comprises:
  sending the first connection establishment indication to the relay node by using the second connection or the third connection.

3. The method according to claim 2, wherein before generating the first connection establishment indication and the second connection establishment indication according to the indication message, the method further comprises:

receiving, by using the second connection, a first identifier sent by the relay node for representing a relay node at which the first user equipment part is located;
receiving, by using the third connection, a second identifier sent by the relay node for representing a relay node at which the second user equipment part is located;
detecting whether the first identifier matches the second identifier; and
when a detection result is that the first identifier matches the second identifier, performing generating the first connection establishment indication and the second connection establishment indication according to the indication message.

4. The method according to claim 1, wherein:
the indication message comprises an identifier of the second user equipment part, or the indication message comprises an identifier of the first user equipment part and an identifier of the second user equipment part;
the first base station stores an identifier of the second base station;
sending a first connection establishment indication to the relay node by using the at least one connection between the first base station and the relay node comprises:
  sending the first connection establishment indication comprising the identifier of the second user equipment part and the identifier of the second base station to the relay node by using the at least one connection between the first base station and the relay node, wherein the relay node performs interaction with the second base station according to the identifier of the second user equipment part and the identifier of the second base station to establish the connection between the second user equipment part and the second base station; and
sending a second connection establishment indication to a second base station by using an original connection between the first base station and the second base station comprises:
  sending the second connection establishment indication comprising the identifier of the second user equipment part to the second base station by using the original connection between the first base station and the second base station, wherein the second base station performs interaction with the relay node according to the identifier of the second user equipment part to establish the connection between the second user equipment part and the second base station.

5. The method according to claim 4, further comprising:
receiving, by using the original connection between the first base station and the second base station, an access channel resource sent by the second base station; and
sending the access channel resource to the relay node by using the at least one connection between the first base station and the relay node, wherein the relay node performs interaction with the second base station according to the access channel resource to establish the connection between the second user equipment part and the second base station, wherein the access channel resource comprises an access channel preamble code preamble code.

6. The method according to claim 4, further comprising:
sending configuration information to the second base station by using the original connection between the first base station and the second base station for configuring the connection between the second user equipment part and the second base station according to the configuration information; or sending configuration information to the relay node by using the at least one connection between the first base station and the relay node, wherein the relay node sends the configuration information to the second base station by using the connection between the second user equipment part and the second base station and or configuring the connection between the second user equipment part and the second base station according to the configuration information.

7. The method according to claim 6, wherein the configuration information comprises: radio bearer (RB) configuration information and/or subframe configuration information.

8. A first base station, comprising:
a transmitter;
a receiver; and
a processor configured to:
control the receiver and the transmitter to perform interaction with a relay node to establish at least one connection between the first base station and the relay node, wherein the relay node comprises a first user equipment part and a second user equipment part, and the at least one connection comprises a first radio resource control (RRC) connection between the first base station and the first user equipment part,
control the transmitter to send a first connection establishment indication to the relay node by using the first RRC connection between the first base station and the first user equipment part,
control the transmitter to send a second connection establishment indication to a second base station by using an original connection between the first base station and the second base station, the first connection establishment indication for instructing the relay node to perform interaction with the second base station for establishing a second RRC connection between the second user equipment part and the second base station and for switching the second RRC connection between the second user equipment part and the second base station over to a backhaul link, and
switch the first RRC connection between the first base station and the first user equipment part over to a backhaul link; and
wherein the processor is configured to:
control the receiver and the transmitter to perform first connection establishment interaction with the relay node to establish a first connection, wherein the first connection is the connection between the first base station and the first user equipment part; and
control the receiver and the transmitter to perform second connection establishment interaction with the relay node to establish a second connection and a third connection, wherein the second connection is the first RRC connection between the first base station and the first user equipment part, and the third connection is a third RRC connection between the first base station and the second user equipment part; and
wherein:
the receiver is configured to: after the processor controls the receiver and the transmitter to perform the first connection establishment interaction with the relay node to establish the first connection, receive, by using the first connection, an indication message sent by the relay node; and the processor is configured to:
generate the first connection establishment indication and the second connection establishment indication according to the indication message received by the receiver, and
control the transmitter to send the first connection establishment indication to the relay node by using the first connection; and
wherein the receiver is configured to: before the processor generates the first connection establishment indication and the second connection establishment indication according to the indication message, receive, by using the first connection, a type identifier sent by the relay node for indicating a type of the relay node; and
the processor is configured to:
detect according to the type identifier whether the type of the relay node conforms to a predetermined type, and
when a detection result is that the type of the relay node conforms to the predetermined type, generate the first connection establishment indication and the second connection establishment indication according to the indication message.

9. The first base station according to claim 8, wherein:
the receiver is configured to: after the processor controls the receiver and the transmitter to perform the second connection establishment interaction with the relay node to establish the second connection and the third connection, receive, by using the second connection or the third connection, an indication message sent by the relay node; and
the processor is configured to:
generate the first connection establishment indication and the second connection establishment indication according to the indication message received by the receiver, and
control the transmitter to send the first connection establishment indication to the relay node by using the second connection or the third connection.

10. The first base station according to claim 9, wherein:
the receiver is configured to: before the processor generates the first connection establishment indication and the second connection establishment indication according to the indication message, receive, by using the second connection, a first identifier sent by the relay node for representing a relay node at which the first user equipment part is located, and receive, by using the third connection, a second identifier sent by the relay node for representing a relay node at which the second user equipment part is located; and
the processor is configured to:
detect whether the first identifier matches the second identifier, and
when a detection result is that the first identifier matches the second identifier, generate the first connection establishment indication and the second connection establishment indication according to the indication message.

11. The first base station according to claim 8, wherein the processor is configured to:
control the transmitter to send the first connection establishment indication comprising the identifier of the second user equipment part and the identifier of the second base station to the relay node by using the at least one connection between the first base station and the relay node; and control the transmitter to send the second connection establishment indication comprising the identifier of the second user equipment part to the second base station by using the original connection between the first base station and the second base station, wherein the indication message comprises an identifier of the second user equipment part, or the indication message comprises an identifier of the first user equipment part and an identifier of the second user equipment part.

12. The first base station according to claim 11, wherein:
the receiver is configured to: receive, by using the original connection between the first base station and the second base station, an access channel resource sent by the second base station; and
the processor is configured to: control the transmitter to send the access channel resource to the relay node by using the at least one connection between the first base station and the relay node, wherein the relay node performs interaction with the second base station according to the access channel resource to establish the connection between the second user equipment part and the second base station, wherein the access channel resource comprises an access channel preamble code preamble code.

13. The first base station according to claim 11, wherein the processor is configured to:
control the transmitter to send configuration information to the second base station by using the original connection between the first base station and the second base station; and
control the transmitter to send configuration information to the relay node by using the at least one connection between the first base station and the relay node.

14. The first base station according to claim 13, wherein the configuration information comprises: radio bearer (RB) configuration information and/or subframe configuration information.

* * * * *